(12) United States Patent
Takashima et al.

(10) Patent No.: US 11,950,026 B2
(45) Date of Patent: Apr. 2, 2024

(54) METHODS AND APPARATUS EMPLOYING ANGULAR AND SPATIAL MODULATION OF LIGHT

(71) Applicant: Arizona Board of Regents on Behalf of the University of Arizona, Tucson, AZ (US)

(72) Inventors: Yuzuru Takashima, Tucson, AZ (US); Brandon Hellman, Tucson, AZ (US); Braden Smith, Tucson, AZ (US)

(73) Assignee: ARIZONA BOARD OF REGENTS ON BEHALF OF THE UNIVERSITY OF ARIZONA, Tucson, AZ (US)

(*) Notice: Subject to any disclaimer, the term of this patent is extended or adjusted under 35 U.S.C. 154(b) by 0 days.

(21) Appl. No.: 16/604,860

(22) PCT Filed: Apr. 13, 2018

(86) PCT No.: PCT/US2018/027624
§ 371 (c)(1),
(2) Date: Oct. 11, 2019

(87) PCT Pub. No.: WO2018/191696
PCT Pub. Date: Oct. 18, 2018

(65) Prior Publication Data
US 2021/0136332 A1    May 6, 2021

Related U.S. Application Data

(60) Provisional application No. 62/485,596, filed on Apr. 14, 2017.

(51) Int. Cl.
*H04N 9/31*        (2006.01)
*G02B 26/08*       (2006.01)
(Continued)

(52) U.S. Cl.
CPC ....... *H04N 9/3108* (2013.01); *G02B 26/0833* (2013.01); *H04N 9/3152* (2013.01);
(Continued)

(58) Field of Classification Search
None
See application file for complete search history.

(56) References Cited

U.S. PATENT DOCUMENTS 6,707,591 B2    3/2004  Amm
7,459,333 B2   12/2008  Richards et al.
(Continued)

FOREIGN PATENT DOCUMENTS

WO   2017115076   7/2017
WO   2017115081   7/2017
(Continued)

OTHER PUBLICATIONS

Gittard, Shaun D., "Fabrication of microscale medical devices by two-photon polymerization with multiple foci via a spatial light modulator", Oct. 26, 2011, Biomedical Optics Express, vol. 2, No. 11, pp. 3167-3178.
(Continued)

*Primary Examiner* — John W Miller
*Assistant Examiner* — Sean N. Haiem
(74) *Attorney, Agent, or Firm* — George R. McGuire

(57) ABSTRACT

A light projection system including a light source and a light controller to generate modulatable beams of light and an angular light modulator (ALM) positioned to selectively direct the light from each beam. The light controller can be a spatial light modulator or a processor programmed to control light output. The angular light modulator may be a digital micromirror device (DMD). The ALM may be configured to direct the images into diffraction orders or using scanning the images. A LIDAR system to detect a position
(Continued)

of an object including a first source of a two-dimensional array of beams of light and ALM to project light into a selected one of a plurality of directions. An illumination system, comprising a first angular-spatial light modulator (ASLM) and a second ASLM system configured such a first beam and a second beam of light intersect.

17 Claims, 18 Drawing Sheets

(51) Int. Cl.
    *G01S 7/484* (2006.01)
    *H04N 23/56* (2023.01)
(52) U.S. Cl.
    CPC ............ *H04N 9/3164* (2013.01); *G01S 7/484* (2013.01); *H04N 23/56* (2023.01)

(56) References Cited

U.S. PATENT DOCUMENTS

| | | | |
|---|---|---|---|
| 8,660,154 B1 | 2/2014 | Strong | |
| 9,182,278 B2* | 11/2015 | Day | G01J 3/16 |
| 9,983,394 B2* | 5/2018 | Tatsuno | G03B 21/28 |
| 2001/0010536 A1* | 8/2001 | Katzir | G03F 7/704 347/255 |
| 2002/0079432 A1 | 6/2002 | Lee et al. | |
| 2002/0122595 A1* | 9/2002 | Crill | G06F 16/583 382/211 |
| 2003/0112507 A1 | 6/2003 | Divelbiss et al. | |
| 2004/0080938 A1 | 4/2004 | Holman et al. | |
| 2005/0243439 A1* | 11/2005 | Tomita | G02B 13/0055 359/726 |
| 2008/0094578 A1* | 4/2008 | Thollot | G02B 27/283 353/20 |
| 2009/0021456 A1 | 1/2009 | Deppe et al. | |
| 2009/0115990 A1* | 5/2009 | Owa | G03F 7/70116 355/71 |
| 2010/0014136 A1 | 1/2010 | Haussler et al. | |
| 2010/0053711 A1 | 3/2010 | Haussler | |
| 2010/0134662 A1* | 6/2010 | Bub | H04N 5/23245 348/E5.037 |
| 2010/0157399 A1 | 6/2010 | Kroll et al. | |
| 2010/0296148 A1 | 11/2010 | Reichelt et al. | |
| 2011/0074983 A1* | 3/2011 | Bush | H04N 5/2254 348/241 |
| 2011/0181864 A1 | 7/2011 | Schmitt et al. | |
| 2011/0261094 A1 | 10/2011 | Ruckmongathan | |
| 2012/0038892 A1 | 2/2012 | Kurtz et al. | |
| 2012/0038903 A1* | 2/2012 | Weimer | G01S 7/4868 356/4.07 |
| 2013/0182239 A1* | 7/2013 | Kaiser | G01S 7/4811 356/4.01 |
| 2014/0043460 A1* | 2/2014 | Hartell | G02B 21/365 348/79 |
| 2014/0240514 A1* | 8/2014 | Love | H04N 5/332 348/164 |
| 2014/0253713 A1* | 9/2014 | Zhai | G01S 17/89 348/80 |
| 2015/0268479 A1 | 9/2015 | Woodgate et al. | |
| 2016/0033642 A1 | 2/2016 | Fluckiger | |
| 2016/0033757 A1* | 2/2016 | Kurtz | G02B 26/0833 359/292 |
| 2016/0313695 A1 | 10/2016 | Futterer | |
| 2017/0003392 A1 | 1/2017 | Bartlett et al. | |
| 2017/0018214 A1 | 1/2017 | Black et al. | |
| 2017/0018215 A1 | 1/2017 | Black et al. | |
| 2018/0260649 A1* | 9/2018 | Kadambe | G02B 26/0833 |

FOREIGN PATENT DOCUMENTS

| | | |
|---|---|---|
| WO | 2018191694 | 10/2018 |
| WO | 2018191696 | 10/2018 |

OTHER PUBLICATIONS

Ozdemir, Aytekin, et al., "Analysis of the focusing crosstalk effects of broadband all-dielectric planar metasurface microlens arrays for ultra-compact optical device applications", Sep. 27, 2018, OSA Continuum, vol. 1, No. 2, pp. 506-520.

International Search Report and Written Opinion for International Application No. PCT/US2018/027624 dated Aug. 10, 2018; 13 pages.

* cited by examiner

DATA CUBE

METHODS AND APPARATUS EMPLOYING ANGULAR AND SPATIAL MODULATION OF LIGHT

RELATED APPLICATION

The present application is a national stage application under 35 U.S.C. 371 based on international patent application PCT/US18/27624 filed on Apr. 13, 2018, which relates and claims priority to U.S. Provisional Application No. 62/485,596 filed on Apr. 14, 2017 having a title METHODS AND APPARATUS EMPLOYING ANGULAR AND SPATIAL MODULATION OF LIGHT under 35 U.S.C. § 119 (e), the substance of each of said applications is hereby incorporated by reference in its entirety.

FIELD

Methods and apparatus to achieve both angular and spatial light modulation.

BACKGROUND

Digital displays, such as TV screens, laptop screens, phone screens and digital projectors all create images in a pixel-by-pixel manner in a single plane using a Spatial Light Modulator (SLM). SLMs take various forms, such as liquid crystal devices or Liquid Crystal on Silicon (LCoS) devices or nematic liquid crystal devices. For each SLM, a plane is divided into data channels (also referred to herein as SLM pixels), which control the brightness of light emerging from each pixel.

Commonly, a display provides images of different colors (e.g., red, green and blue) which are separately modulated and spatially overlapped. Projection of light from the overlapped images results in the formation of a single full-color image.

The Degrees of Freedom (DOF) of an SLM refers to the number of independent data channels available in the device. Conventionally, DOF are determined by the total number of pixels in an SLM. Each pixel is controlled independently of the other pixels, thereby allowing each pixel to take on any brightness level without regard to other pixels. This structure of independent channels allows the SLM to create arbitrary images. FIG. 1 illustrates a data array of brightness levels (i.e., assigned numerical values) having "n" pixels in a first dimension and "m" pixels in a second dimension. The array defines a frame of an image.

The information bandwidth supported by an SLM is limited by the DOF. Increasing the pixel density of an SLM allows more information to be defined in a same area per frame, leading to higher resolution images.

Conventional 3D technology presents an observer with two different images, one for each eye, and relies on parallax associated with the images to generate a 3D effect. Projecting two images in such a manner requires a doubling of the DOF (i.e., the number of independent channels (pixels)).

In 3D movie theaters, two images are simultaneously projected to the screen. Audience members wear "3D glasses" to filter the overlapping images: all right eyes see one image and all left eyes see the other. For example, one technology uses a headset with high frequency electronic shutters to alternate between opening a left eye path and a right eye path while corresponding images are projected on the screen in a manner synchronous with the shutters of the headset. Another technology uses two orthogonal polarizers in a headset which correspond to the two images projected to the screen with orthogonal polarization states. The right eye polarizer prevents left eye images from reaching the right eye, and the left eye polarizer prevents right eye images from reaching the left eye. For such 3D systems, two data arrays of brightness levels define a frame of an image. An example of two such data arrays to be used in a 3D system using polarizers is shown in FIG. 2.

Two or more, two-dimensional data arrays to be processed, in parallel, is referred to as a data cube (schematically shown in FIG. 3).

SUMMARY

According to aspects of the present invention, the inventors have determined numerous systems and methods for projecting images that comprise a data cube, where each image of the cube is projected in a different angular direction.

A pixel of an angular light modulator as described herein refers to a plurality of actuatable elements of the ALM that operate together to achieve a particular result (e.g. to diffract a beam projected thereon).

A first aspect of the invention is directed to a camera to obtain a sequence of images of an object, comprising a first lens adapted to receive light from the object, an angular light modulator (ALM) comprising a plurality of actuatable elements positioned to receive the light from the first lens, a detector array positioned to receive the light from the ALM, and at least one processor coupled to the ALM adapted to actuate the actuatable elements to project a first image of the object onto a first portion of the detector array, and to actuate the actuatable elements to project a second image of the object onto a second portion of the detector array.

In some embodiments, the ALM comprises one of a digital micromirror device (DMD), a grating light valve, a membrane mirror, a linear deformable mirror or a reflection-type LCOS phase modulator.

In some embodiments, the processor is programmed to operate the plurality of actuatable elements of ALM such that they project the first image at a first angle determined by a first diffraction order of the ALM at a first time, and such that the plurality of pixels project the second image at a second angle determined by a second diffraction order of the ALM at a second time.

The detector may be one of a CMOS array, a CCD array and an avalanche photodiode array. The first image and the second image may overlap, and the at least one processor is programed to separate the first image and the second image.

In some embodiments, the camera further comprises an illumination source to illuminate the object.

The illumination source may be a pulsed light source to achieve a freezing effect of the ALM.

In some embodiments, the first diffraction order and the second diffraction order are offset from one another in a first direction, the camera further comprising a second lens adapted to receive light from the object and project a third image at a third angle determined by a third diffraction order of the ALM and the second lens, the first lens and the second lens being offset from one another in a second direction which optically corresponds to the direction along which the diffraction orders are offset.

In some embodiments, the first diffraction order and the second diffraction order are offset in a direction, the camera further comprising a second lens adapted to receive light from the object and project a third image at a third angle determined by a third diffraction order of the ALM and the second lens, the first lens and the second lens being offset from one another in a direction perpendicular to the direction which optically corresponds to the direction along which the diffraction orders are offset.

Another aspect of the invention is directed to a LIDAR system to detect a position of an object, comprising a light source, a light controller optically or electrically coupled to the light source, such that that a combination of the light source and the light controller constitutes a first source of a two-dimensional array of beams of light, an angular light modulator (ALM) positioned to receive each of the beams of light in the array, the ALM configured to project light into a selected one of a plurality of directions, and a range finding detection module coupled to the source and comprising a detector to receive light from one of the beams of light after the light is reflected from the object.

The selected one of the plurality of directions may be determined by a diffraction order of the ALM.

In some embodiments, the ALM comprises a plurality of mirrors, the system further comprising a lens configured to focus light from at least one of the beams of light onto only one of the plurality of mirrors, and the plurality of directions are determined by a tilt of the one of the plurality of mirrors.

The light controller may comprise a controller, the controller adapted to control the light source to selectively output one of the plurality of beams. In some embodiments, the light controller comprises a spatial light modulator, the spatial light modulator configured to control an output of one of the plurality of beams from the first source.

Yet another aspect of the invention is directed to an illumination system, comprising a first ASLM subsystem and a second ASLM system, the first ASLM subsystem and second ASLM subsystem are configured such a first beam of light projected from the first subsystem and a second beam of light projected form the second subsystem intersect.

In some embodiments, at least one of the first beam and the second beam is projected in a selected one of the plurality of directions, the one of the plurality of directions being determined by a diffraction order of a corresponding one of the first ASLM and the second ASLM.

In some embodiments, at least one of the first ASLM and the second ASLM comprises a plurality of mirrors, the system further comprising a lens configured to focus light from at least one of the first beam and the second beam on a corresponding one of the plurality of mirrors, a tilt of the one of the plurality of mirrors determining a direction of the at least one of the first beam and the second beam.

The at least one of the first ASLM and the second ASLM may comprise a light source and a processor, the processor adapted to control the light source to selectively output one of the first beam and the second beam.

In some embodiments, the at least one of the first ASLM and the second ASLM comprises a spatial light modulator, wherein the spatial light modulator is configured to control to selectively output one of the first beam and the second beam.

These and other aspects of the present invention will become apparent upon a review of the following detailed description and the claims appended thereto.

DETAILED DESCRIPTION

Aspects of the invention will be further illustrated with reference to the following specific examples. It is understood that these examples are given by way of illustration and are not meant to limit the disclosure or the claims to any particular example.

Figure 4:
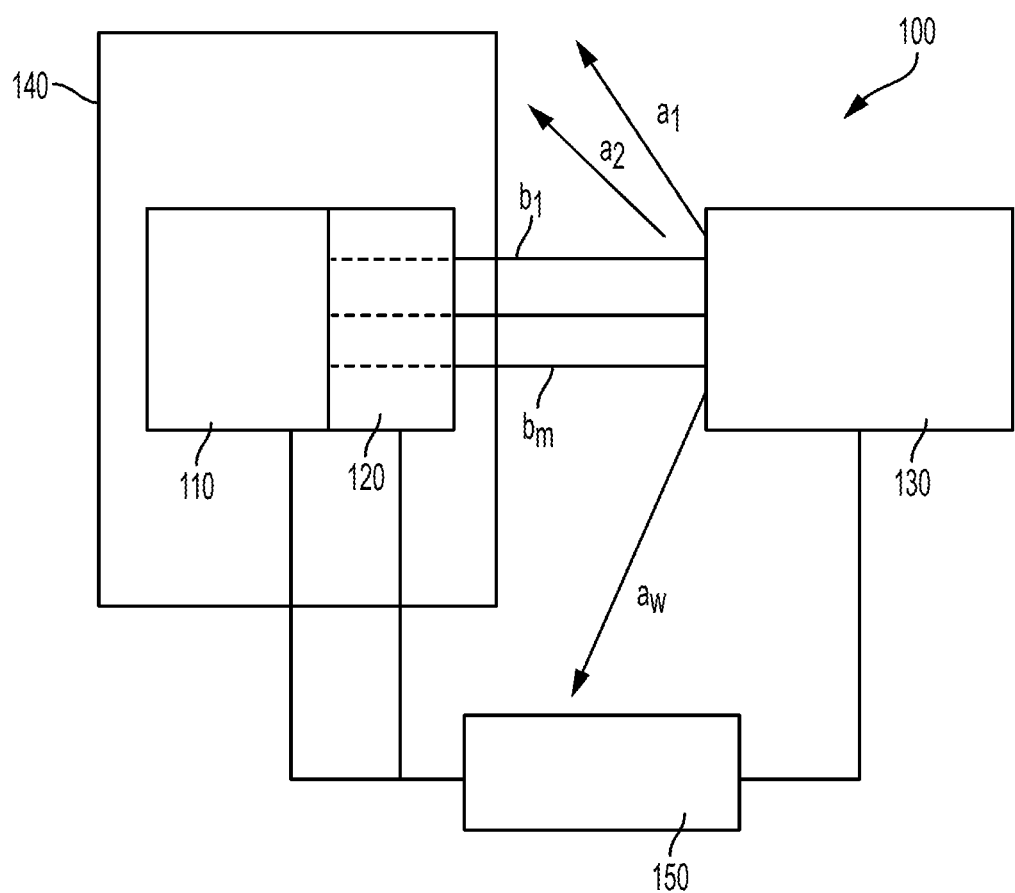
FIG. 4 is a block diagram schematically illustrating an example of a light projection system (also referred to herein as a "projector") according to aspects of the present invention.

FIG. 4 is a block diagram schematically illustrating an example of a light projection system 100 (also referred to herein as a "projector") according to aspects of the present invention. Light projection system 100 comprises a light source 110, a light controller 120, and a spatially-dependent, angular light modulator (ALM) 130. An ALM is a device able to steer a beam incident thereon into a plurality of output angles, at different times. A spatially-dependent ALM includes spatially-separated light directing elements having separate light directing structure (e.g., mechanical movement structures) that may or may not be independently controlled.

Light controller 120 is optically and/or electrically coupled to light source 110, such that a combination of light source 110 and light controller 120 constitutes a first source 140 of a plurality of spatially-separated and independently-modulatable beams of light.

A processor 150 is programmed to control the source 110, light controller 120 and ALM to operate as described herein. Processor 150 and a processor in first source 140 as described above may be the same or different processors.

Light source 110 and light controller 120 each can take several different forms, and can be combined into various embodiments of a first source 140.

Figure 5:
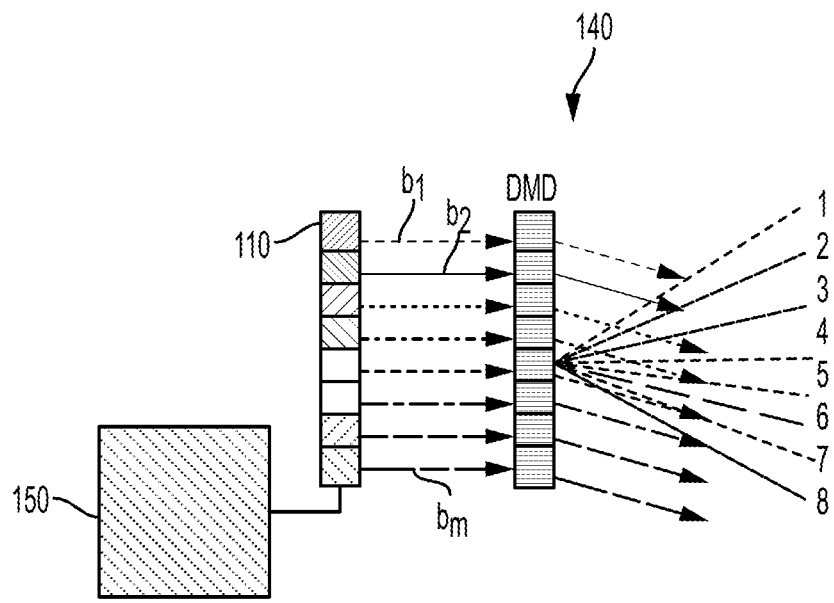
FIG. 5 is a schematic illustration of a projector comprising a light controller may comprising a processor programmed to control the light output from each of the lasers of a light source to generate a plurality of spatially separated beams $b_1, b_2 \ldots b_n$.

In some embodiments, the light source 110 can comprise an array of light emitting devices (e.g., a two-dimensional array) to produce spatially offset, parallel, collimated beams. In such embodiments, the light source can comprise a plurality of discrete lasers or a laser diode array or a plurality of collimated light emitting diodes (LEDs). In some embodiments, as illustrated in FIG. 5, the light controller 120 may comprise a processor 150 programmed to control the light output from each of the lasers of light source 110, for example, by controlling a current and/or voltage applied to each of the lasers or to control each laser's driver. In some embodiments, each laser emits light of a same wavelength as the other lasers. In FIG. 5 ALM 130 is shown as transmissive for ease of illustration; however, ALM 130 may be transmissive or reflective.

Figure 6:
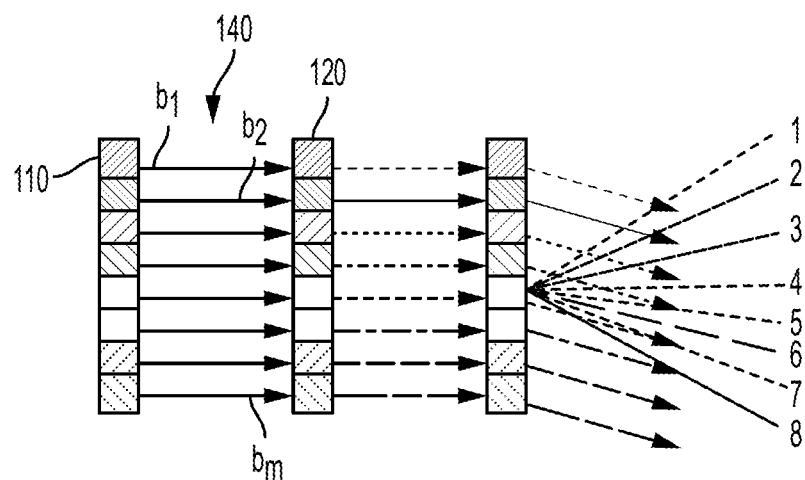
FIG. 6 is a schematic illustration of a projector comprising a light controller beam where the output from each laser of a source is modulated by passing the laser outputs through a spatial light modulator to generate a plurality of spatially separated beams $b_1, b_2 \ldots b_n$.

Alternatively, in some embodiments, as illustrated in FIG. 6, the beam output from each laser is modulated by passing the laser outputs through a spatial light modulator (SLM) (e.g., a two-dimensional liquid crystal device (LCD), a liquid crystal on silicon (LCoS) device or other known or yet-to-be developed device) controlled by controller 150 to form beams $b_1, b_2 \ldots b_m$. The SLM has a defined spatial distribution to attenuate each beam independently. In some embodiments, each laser emits light of a same wavelength as the other lasers.

Figure 7A:
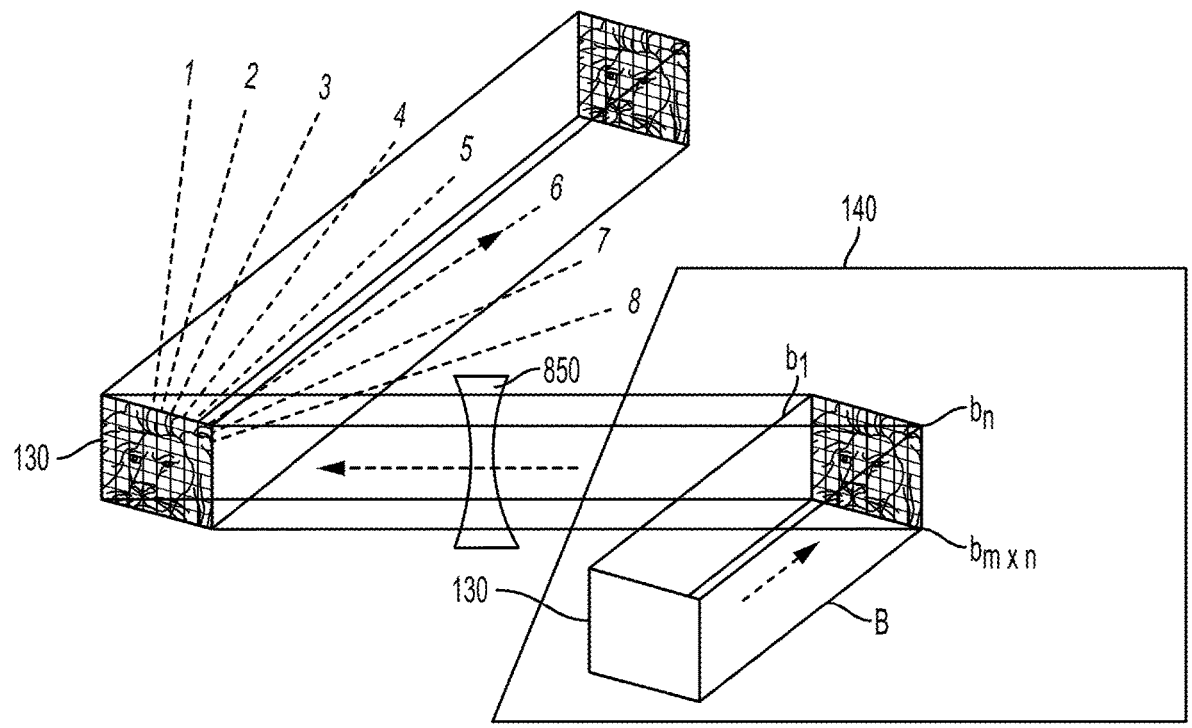
FIG. 7A is a schematic illustration of a projector comprising a light controller having a single expanded beam B used to generate a plurality of spatially separated beams $b_1, b_2 \ldots b_n$.

In some embodiments, (as shown in FIG. 7A) a single expanded beam B is produced (e.g., light source 110 comprises a laser beam having an output beam expanded by a conventional beam expander (not shown)). The expanded beam is used to generate light for the plurality of spatially separated beams $b_1, b_2 \ldots b_{m \times n}$. The spatial distribution of the plurality of beams $b_1, b_2 \ldots b_{m \times n}$ is generated, for example, by passing the expanded beam onto or through a light controller 120 comprising a spatial light modulator (SLM) (e.g., an LCD or LCoS device) located such that the expanded beam passes therethrough and each of the plurality of beams $b_1, b_2 \ldots b_{m \times n}$ is formed by pixels of an SLM (i.e., light controller 120). Processor 150 controls the SLM to control the light brightness in each beam $b_1$-$b_n$. In each embodiment, the beams $b_1$-$b_{m \times n}$ are processed by the first light source and projected at the ALM in parallel.

Referring again to FIG. 4, spatially-dependent, angular light modulator 130 is positioned to receive the beams of light $b_1$-$b_m$ (where only one column of beams is shown) and selectively direct the light from all beams into one of a plurality of directions $a_1$-$a_w$.

Two implementations of an ALM 130 to direct light into different angular directions are described in U.S. provisional patent application 62/485,579 filed Apr. 14, 2017 and PCT patent application, filed on even date herewith, both having a title SYSTEMS AND METHODS FOR BEAM STEERING USING A MICROMIRROR DEVICE, the substance of both of said applications is hereby incorporated by reference herein in their entireties. In each implementation, an ALM comprising a plurality of actuatable elements is used. The implementations are as follows: (1) a collimated beam is directed at each pixel of a diffractive, spatially-dependent, angular light modulator (e.g., a digital micromirror device (DMD)), the beam diameters are selected to be several actuatable elements (e.g., mirrors in a DMD) wide, such that diffraction of the beams occurs, and the beams can be selectively steered between discrete angles (i.e., diffraction orders) (further details regarding beam steering using implementation (1) are given below), and (2) each beam is focused onto a single actuation element of the ALM (e.g., one mirror of a digital micromirror device (DMD)) or other acutatable mirror device, and steered over a continuously varying angle. Each beam can be steered continuously, and the beam will diverge from its focus point on the mirror (further details regarding beam steering are given below). Either spatially-dependent, angular light modulator implementation may be used in embodiments of the present invention as set forth herein.

Figure 8A:
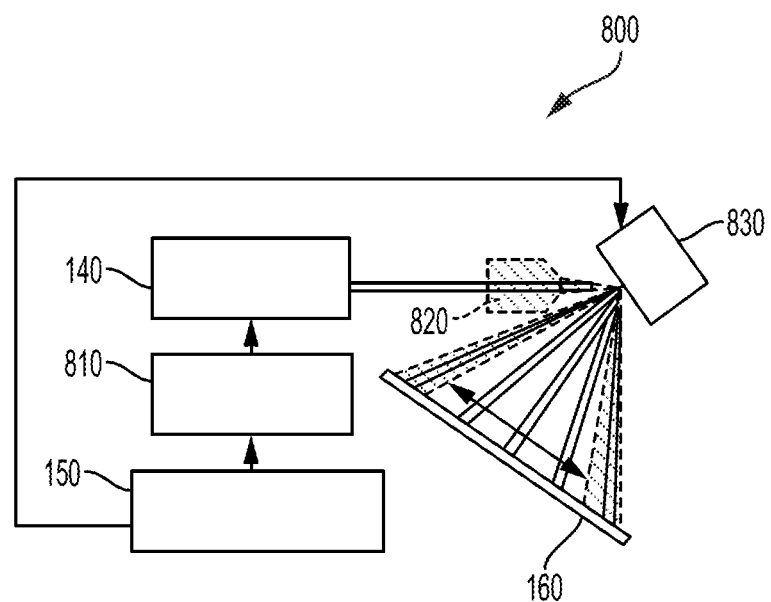
FIG. 8A is a schematic illustration of an example of a projector according to aspects of the present invention.

FIG. 8A is a schematic illustration of an example of a projector 800 according to aspects of the present invention. Projector 800 comprises DMD 130, a first source 140, and a processor 150. As described below, apparatus 800 may include a collimating or focusing lens 1010 and/or a delay 810.

Figures 8B, 8C, 8D, 8E:
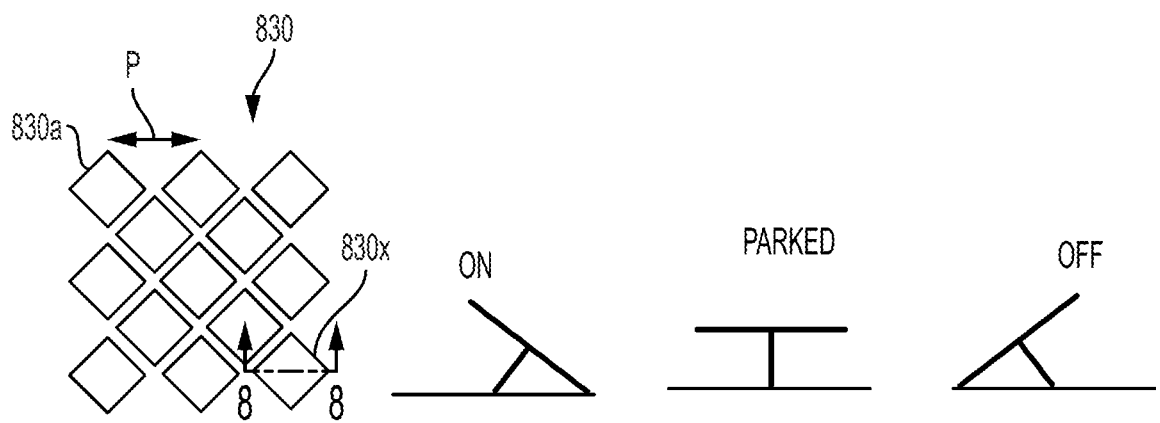
FIG. 8B, is a schematic illustration of a digital micromirror device (DMD) having micromirrors arranged in a diamond configuration.
FIG. 8C-8E is a schematic illustration of a mirror of the DMD of FIG. 8B in various states of operation.

FIG. 8B is a schematic illustration showing further details of an example DMD 800 suitable for use in the present invention. DMD 800 has micromirror elements 830a-830x (also referred to as micromirrors) having a pitch, p, adapted to impart a modulation on a wavefront incident on the DMD during a transition between a first state and a second state, wherein the DMD has a transition time, T, between the first state and second state. In some embodiments, the first state and the second state correspond to an ON state and an OFF state of a conventional DMD, respectively.

For example, the DMD may comprise a 608×684 array (horizontal by vertical) of micromirrors such as part DLP3000 available from Texas Instruments of Dallas, TX. As shown in FIG. 8B, the micromirrors may be positioned in a diamond configuration with a pitch of 10.8 μm. In DMD 830, the micromirrors flip between an ON state (shown in FIG. 8C as a viewed along section line 8-8 in FIG. 8B) and an OFF state (shown in FIG. 8E as a viewed along section line 8-8 in FIG. 8B) by rotating+/−12o about an axis defined relative to a normal of a micromirror when in the PARKED position. FIG. 8D shows the DMD in a non-operational PARKED position. It is to be appreciated that the PARKED position is not a typical operational state of the DMD, but rather a transitional position. It is also to be appreciated that, in the illustrated embodiment, a DMD (e.g., DMD 830) is designed for binary spatial light modulation and positions between the ON and OFF states not intended to be used for angular beam steering as described herein.

By another example, the DMD, such as part DLP2010 available from Texas Instruments of Dallas, TX, may have micromirrors which rotate+/−17o about an axis which is not perpendicular to the normal of the DMD package. In this case, during operation, the micromirrors are never parallel to the DMD package.

In some embodiments, DMD mirrors move continuously between the ON and OFF states with a typical transition time on the order of a few micro seconds. According to some aspects of the invention, a heretofore unused transitional state of the DMD is utilized by projecting a short pulsed laser whose pulse duration is much shorter (e.g., $T/t_{max}$ may be equal to or greater than any of 50, 100, 250) than the transition time of the mirrors. With the short pulsed beam (e.g., beams $b_1$-$b_m$), the micromirror movement can be "frozen" at a plurality of angles between the stationary ON and OFF states. Thus it is feasible to form a programmable blazed diffraction grating to discretely steer a collimated beam (e.g., a laser beam). As described in greater detail below, it is also feasible to create a continuously scanned beam if the laser beam is projected onto a single DMD mirror thereby avoiding the diffraction grating effects caused by using multiple micromirrors to direct a single beam.

The driver for DLP3000 contains an external trigger port that may be used to switch the mirror array between the "ON" and "OFF" states displaying an all-white or all-black bitmap image, respectively. In the illustrated embodiment, both the DMD driver and first source 140 are controlled by a processor 150 (e.g., microcontroller Arduino Uno, Arduino of Italy). The trigger signal sent to first source 140 may be delayed by delay line 810 to synchronize the laser pulse from light source 110 with the movement of the micromirrors in DMD 830.

Figure 8F:
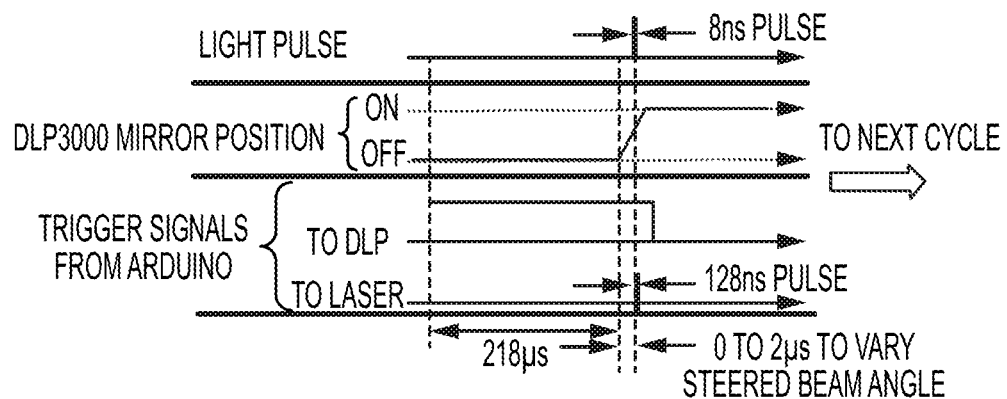
FIG. 8F is an example of a timing diagram for operation of beam steering apparatus.

For example, a desired delay time for the trigger to the first source relative to the trigger input to actuate the micromirrors can be measured experimentally. In one instance, the micromirrors start transitioning about 218 ρs after the external trigger pulse is sent to the DMD driver and takes about 2ρs to complete transitioning. An example of a timing diagram for operation of beam steering apparatus 100 is depicted in FIG. 8F. In some embodiments, a serially programmable timing element 810 (e.g., part number DS1023 from Dallas Semiconductor of Dallas, TX) between processor 150 and first source 140 is added to provide a programmable delay from 0 to 64 ns in 0.25 ns increments to allow processor 150 to introduce a time delay to the signal sent by processor 150 to first source 120 to finely tune the activation of the micromirrors.

Figure 8G:
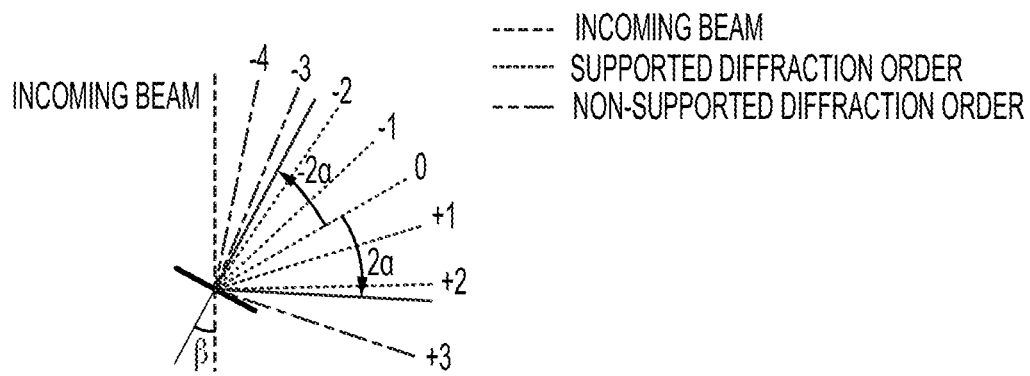
FIG. 8G is a schematic illustration of an incoming beam of light incident on an array of mirrors of a DMD showing generation of a diffraction pattern having various diffraction orders.

As shown in FIG. 8G, an incoming beam of light incident on an array of mirrors as shown in FIG. 8B will generate a diffraction pattern having various orders (e.g., −4, −3, −2, −1, 0, 1, 2, 3, 4).

Figure 8H:
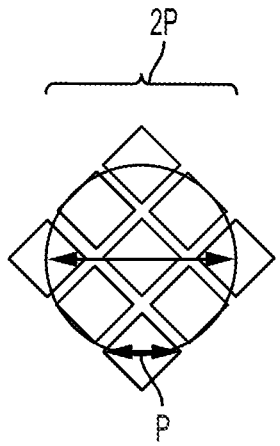
FIG. 8H is a schematic illustration of a DMD having the pitch size p and a beam of selected beam diameter projected thereon.
Figure 8I:
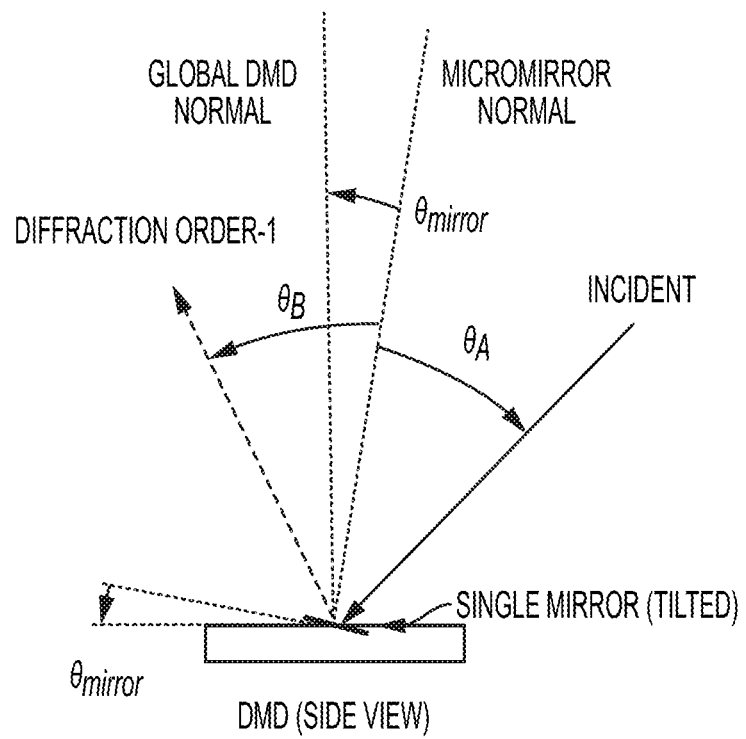
FIG. 8I is a schematic illustration of a DMD having tilted the mirrors in a pixel of the DMD such that the mirrors normals form an angle $\theta_{mirror}$ relative to the DMD normal angle, to selectively direct light into a given order (e.g., order −1)

As shown in FIG. 8H, for the DMD to effectively diffract light in a beam, it is typically desirable that the beam diameter be at least equal to two times the pitch size p. In some embodiments, it is preferable that the beam diameter be at least three times the pitch size p. A group of mirrors positioned to direct a given beam are referred to herein as a pixel of the DMD.

The diffraction orders generated by projecting a beam on an array of mirrors in a manner as described above are defined by the following diffraction grating equation (1):

$$p \sin \theta_m = 2m\lambda \quad (1)$$

where $\theta_m$ is the angle from the zeroth order to the mth order shown in FIG. 8G, p is the mirror pitch (width), λ is the wavelength of light in the beam, and the factor of 2 is due to the diamond micromirror orientation. Eqn. (1) as set forth above is for instances where the angle of incidence of incoming light is normal to the mirror array surfaces. Mirror arrays according to aspects of the present invention may be operated with light projected at any angle with appropriate mathematical consideration.

As shown in FIG. 8, by tilting the mirrors in a pixel of the DMD such that the mirrors' normals form an angle $\theta_{mirror}$ relative to the DMD normal (or in the case of DLP2010 relative to the micromirror normal (when the micromirror is located at the midpoint of its transition) and in the plane perpendicular to the axis of rotation and said line), light can be selectively directed into a given order (e.g., order −1). For example, to efficiently direct light into order −1, the mirrors are angled such that $\theta_A=\theta_B$. In some diffractive embodiments, light is diffracted by the DMD into one of the specific diffraction orders with diffraction efficiencies close to 100% since the frozen state of the tilted DMD mirrors is equivalent to a blazed grating where the slope of the mirror is set to the blaze angle. It will be appreciated that for the DLP2010 the blaze angle is not exactly equal to $\theta_{mirror}$, but calculated using $\theta_{mirror}$ and the DLP geometry.

It will be appreciated that, although the illustrated embodiment has a diamond any suitable orientation may be used. Additionally, mirrors of any suitable shape may be used (e.g., square or rectangle). It will be appreciated that other mirror array shapes and orientations are governed by an equation similar to equation (1), but modified to account for the configuration of the mirror array.

Additionally, although the embodiments above were described with the ALM being a digital micromirror, any actuatable device capable of generating an output therefrom having a same or similar phase map to a DMD may be used. For example, an ALM may be a grating light valve (from Silicon Light Machines of Sunnyvale, CA) or a membrane mirror (from Optron Systems, Inc. of Waltham, MA) or a linear deformable mirror (from Boston Micromachines of Cambridge, MA) or a reflection-type LCOS phase modulator (from Hamamatsu Corporation or Holoeye Photonics AG of Berlin, DE).

Figure 9A:
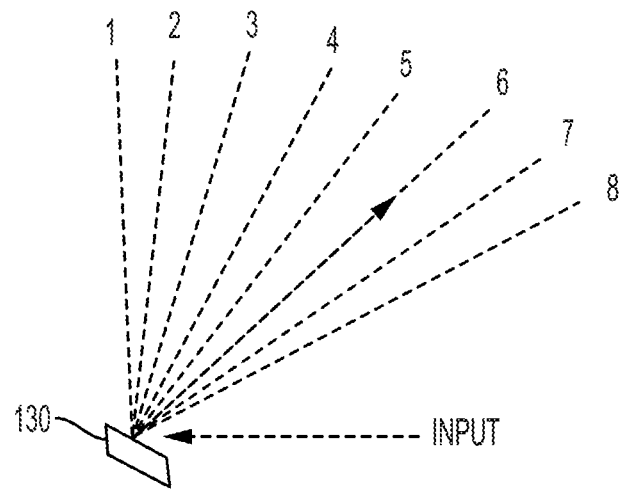
FIG. 9A, illustrates that an ALM can be used to direct each input beams in a selected direction corresponding to a diffraction order.
Figure 9B:
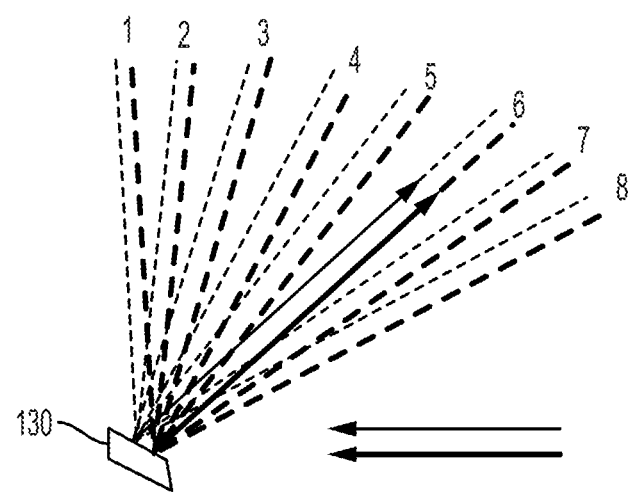
FIG. 9B schematically illustrates the principle that a plurality of spatially offset, parallel, collimated beams can be simultaneously steered in a same direction using different regions of a spatially-dependent, angular light modulator (i.e., an ALM pixel) to direct the beams into a same diffraction order of the ALM.

As shown in FIG. 9A, an ALM can be used to direct each input beam $b_i$ (shown in FIG. 4) in a selected direction $a_1$, $a_2 \ldots a_w$ (shown in FIG. 4) (e.g., into selected diffraction orders). Some embodiments of the invention employ a principle as illustrated in FIG. 9B. According to this principle, two spatially offset, parallel, collimated beams can be steered in a same direction using different regions (i.e., different pixels) of a spatially-dependent, angular light modulator.

It will be appreciated that, if the amplitudes/brightnesses of each input beam is modulated independently, the beams can define different brightnesses at given offset locations in a given direction. It will be further appreciated that a two-dimensional array of offset, parallel, collimated beams may be used, and the brightness distribution of the offset beams would be preserved such that an image (defined by an array of beams from first source 140) can be projected in a particular direction. Accordingly, an image can be projected in the given direction. Typically, each pixel of the SLM is configured to direct a beam into a same diffraction order to project a single image in the diffraction order.

Figure 10A:
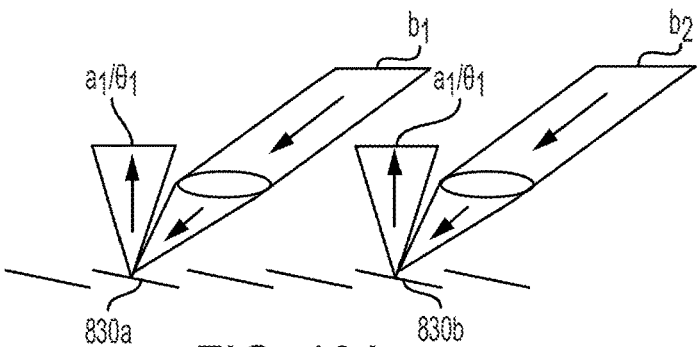
FIGS. 10A and 10B is a schematic side view of one row of a two-dimensional array of lenses of an example of a projection system configured to be operated using continuous tilting of DMD mirrors.
Figure 10B:
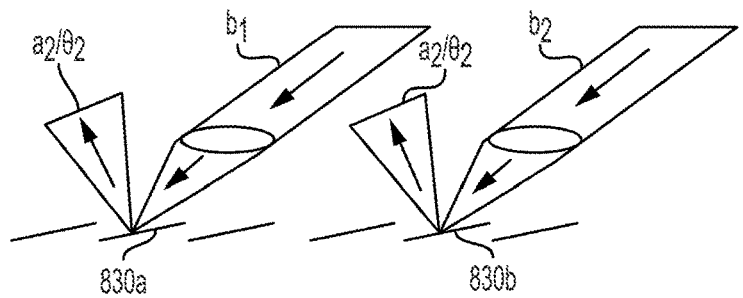

Examples of embodiments of apparatus for achieving implementation (2) are now discussed with reference to FIGS. 10A-10D. FIGS. 10A and 10B show a schematic side view of one row of a two-dimensional array of lenses (including lenses 1010a and 1010b) of a first example projection system configured to be operated to project images using mirrors of a DMD operated using a continuous tilting (i.e., not diffraction into orders of the mirror array) in a first direction $\theta_1$ and a second direction $\theta_2$, respectively. In this embodiment, a pixel of the DMD corresponds to a single mirror 830a or 830b. A plurality of lenses 1010 is configured such that each lens focuses light from a given beam $b_i$ onto a corresponding, single mirror. The light reflected from a given mirror is directed in a direction $a_1$-$a_w$ toward a projection surface or a viewer and all beams of a given image are projected in a same direction. Accordingly, in FIG. 10A, a first image is projected with the mirrors of the DMD at an angle $\theta_1$ (i.e., in a first direction $a_1$) and in FIG. 10B, a second image is projected with the mirrors at a second angle $\theta_2$ (i.e., in a second direction $a_2$). In such a configuration, a pulse of light passes through each lens 1010 only once. Accordingly, such a system is referred to as a single pass system.

Figure 10C:
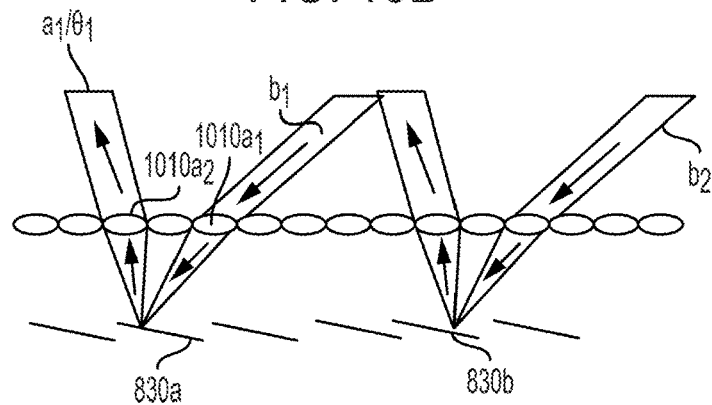
FIGS. 10C and 10D is a schematic side view of one row of a two-dimensional array of lenses of another example of a projection system configured to be operated using continuous tilting of DMD mirrors.
Figure 10D:
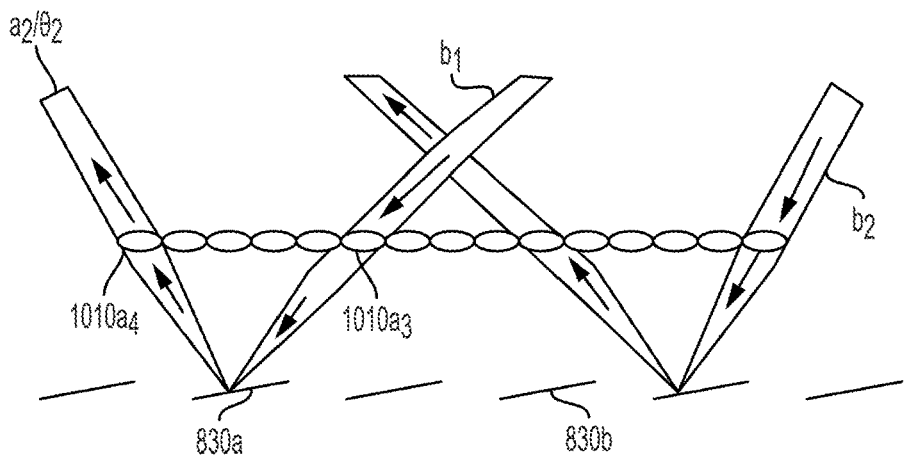

FIGS. 10C and 10D are a schematic side view of one row of a two-dimensional array of a second example of a projection system configured to be operated to project images using mirrors of a DMD that is to be operated using a continuous tilting (i.e., not diffraction into orders of the mirror array). In this embodiment, a pixel of the DMD corresponds to a single mirror 830. A plurality of lenses 1010 is configured such that light in a given beam is focused onto a corresponding, single mirror 830a or 830b by a corresponding first lens $1010a_1$, $1010a_2$. Each mirror 830 has a corresponding second lens $1010a_2$, $1110b_2$ of the plurality of lenses 1010 that is positioned to receive the light of the beam after it reflects from mirror 830 and direct the light in a first direction $a_1$-$a_1$ at a selected angle $\theta_1$-$\theta_n$ toward a first projection surface or a first viewer at a first time, and in a second direction $a_1$-$a_1$ at a selected angle $\theta_1$-$\theta_n$ toward a second projection surface or a second viewer at a second time. Each first lens $1010a_1$ is located so that its corresponding mirror is disposed at a distance equal to the first lens's focal length from the mirror; and each second lens $1010a_2$ is located so that its corresponding mirror 830a is disposed at distance equal to the second lens's focal length from the mirror such that the light sent toward the viewer or projection surface at angle $\theta_1$ is collimated. Each mirror operates similarly to project light at a second angle $\theta_2$ using two different lenses than those used to project at first angle $\theta_1$.

Figure 7B:
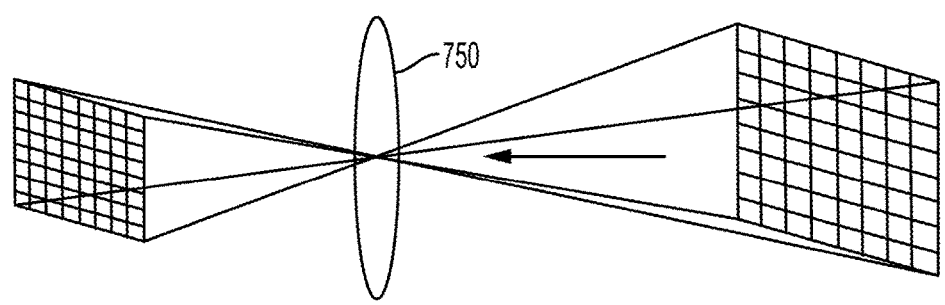
FIG. 7B is a schematic illustration of a portion of a projector having a beam shaping lens disposed between a spatial modulating device and angular modulating device to match beams $b_1, b_2 \ldots b_n$ with pixels of angular light modulator (ALM)

In some embodiments, one or more beam shaping lenses 750 is disposed between the spatial modulating device 120 and angular modulating device 130 to match beams $b_i$ with pixels of angular light modulator (ALM). As shown in FIG. 7B, a lens 750 may be used to project beams $b_i$ to corresponding pixels along a column of an ALM.

Referring again to FIG. 4, a projector comprising an SLM to project light onto an ALM as set forth herein is referred to as an angular-spatial light modulator (ASLM). ASLMs as set forth herein are capable of projecting each of a plurality of different images of an image cube along different output angles. When a projector is used for visualization purposes, images of an data cube are, typically, projected within one integration time of a human eye. Set forth below are further examples of systems where images of an image cube are projected along respective, different angular directions.

"Image Per Angle (IPA)"

Referring to FIGS. 11A-11B and 12A-12C, a projector 1100 has a first source 140 (shown in FIG. 4), an ALM (as described above). First source 140 is configured to modulate light beams to produce a sequence of images. In projector 1100, ALM 130 (shown in FIG. 4) is synchronized with first source 140 such that all beams $b_1, b_2 \ldots b_{m\times n}$ in each of the images of a sequence is directed into a corresponding one of a plurality of angles/directions (e.g., one of diffraction orders labeled as 1-8 in FIGS. 12A-12B). It will be appreciated that the images present in one iteration through the angles defines a data cube 1300, referred to herein as an Image-Per-Angle data cube (shown in FIG. 13).

Plurality of beams $b_1, b_2 \ldots b_{m\times n}$ may, for example, be generated using a single expanded beam directed onto an SLM, as described above with reference to FIG. 7A; however, an array of beams can be generated by a light source and SLM using any of a number of techniques and projected onto the ALM such as described with reference to FIG. 4. It is to be appreciated that, in some embodiments according to this aspect of the invention, as show in FIG. 7A, the images are fully defined before being steered into a particular direction by the ALM.

In embodiments according to this aspect of the invention, projector 1100 is configured to project a single image along each of a plurality of angles, the angles being determined by the diffraction orders (e.g., illustrated as 1-8 in FIGS. 12A-12D) generated by ALM 130. The images projected into the various angles may be same or different than one another.

Figures 11A, 11B:
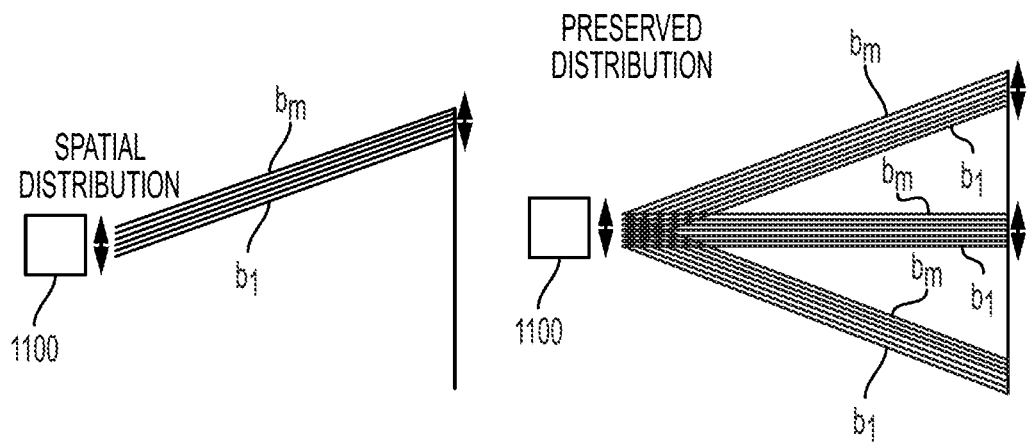
FIGS. 11A-11B and 12A-12B are schematic illustrations of a projector configured to produce images at various angles by synchronizing a first source with an ALM such that all beams in each of the images are directed into a corresponding one of a plurality of angles/directions (referred to herein as an image-per-angle projection system)

In such embodiments of IPA systems, the principle that a plurality of spatially offset, parallel, collimated beams can be simultaneously steered in a same direction using different regions of a spatially-dependent, angular light modulator (i.e., an ALM pixel) to direct the beams into a same diffraction order of the ALM (illustrated in FIGS. 9B and 11a). In such embodiments, a projector 1100 comprises a first source 140, as described above with reference to FIG. 4, to project a plurality of spatially-separated beams $b_1$, $b_2 \ldots b_{m \times n}$ onto an ALM 130 which in turn projects each image in a direction corresponding a given diffraction order as describe above with reference to FIG. 9B.

In other embodiments of IPA systems, each beam is focused onto a single actuation element of the ALM (e.g., one mirror of a digital micromirror device (DMD)) and steered over a continuously varying angle, as described above (e.g., with reference to FIGS. 10A-10D).

It is also to be appreciated that, after being projected onto ALM 130, light at all points across a spatial distribution generated by a first source 140 is caused to travel in a same direction using a diffraction order or continuous scanning. Although this process creates a real image in each direction, since all rays are in the same direction, an observer viewing upstream the light projected in the diffraction order, will only observe a point source. This result occurs because the beam directed to the observer is collimated. The light in such a collimated beam may be presented in a form that is viewable to an observer viewing upstream by adding an optical element 850 (shown in FIG. 7A) having positive or negative power in the path of the light. Optical element 850 may be located in any of a number of locations, including between source 110 and SLM 120 or between SLM 120 and ALM 130 (as shown in FIG. 7A) or between ALM 130 and a viewer.

Figure 12A:
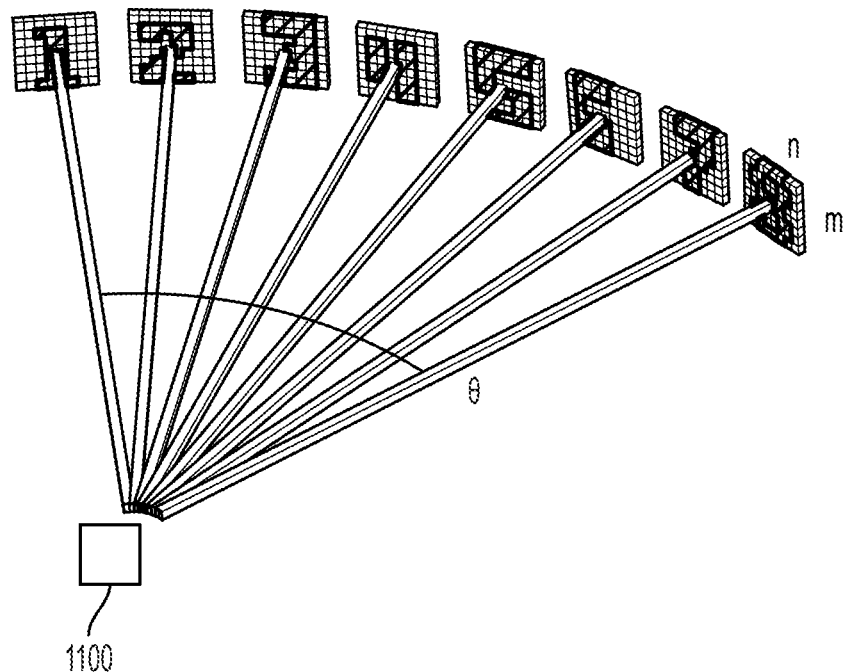
Figure 12B:
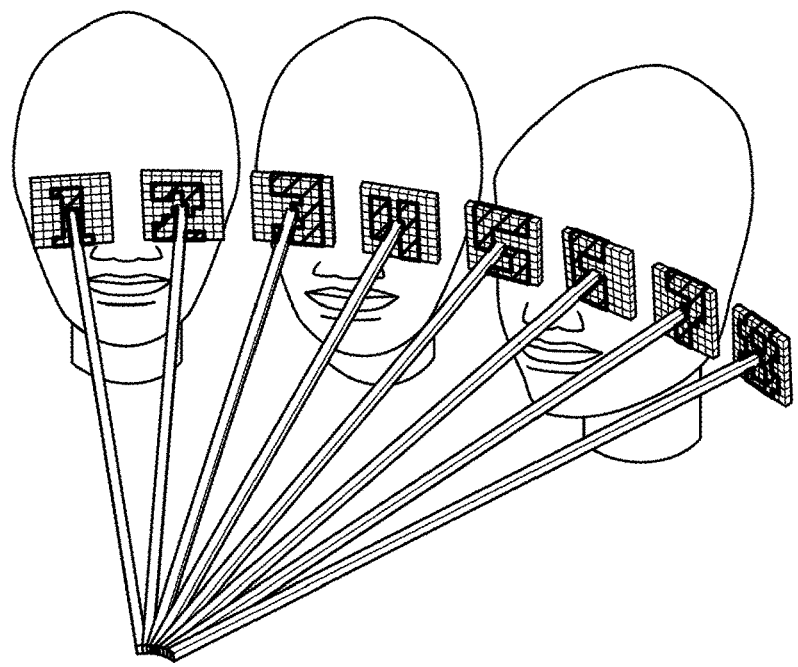
Figure 13:
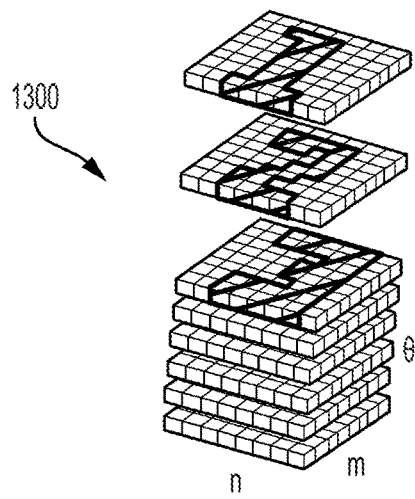
FIG. 13 is a schematic of an image-per-angle data cube.

As shown in FIG. 12B, adjacent images can be images of a same scene from different perspectives such that a viewer of adjacent images perceives the adjacent images as a single 3D image.

Figure 12C:
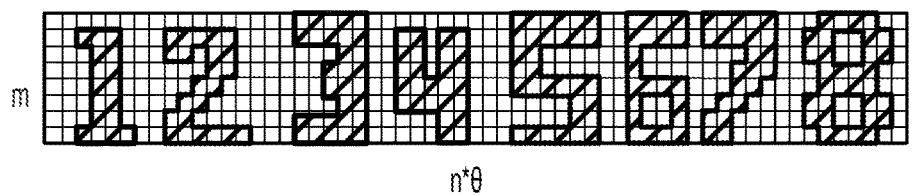
FIG. 12C is a schematic illustration of an image projected using an image per angle projection system where the various angles have sizes selected such that the images abut one another such that the viewer sees one continuous, panoramic image.

As shown in FIG. 12C, an image-per-angle system as described herein can be configured such that the images at the various angles have sizes selected such that the images abut one another such that the viewer sees one continuous, panoramic image (i.e., images 1-8 adjacent to one another) or such a single image can be projected on a display surface as a single panoramic image. It is to be appreciated that if an image-per-angle apparatus having optics configured to project a panoramic image (e.g., the apparatus of FIG. 7A with appropriate magnifications) had the first source 140 replaced by a detector array, the apparatus could operate as panoramic camera.

Figure 14:
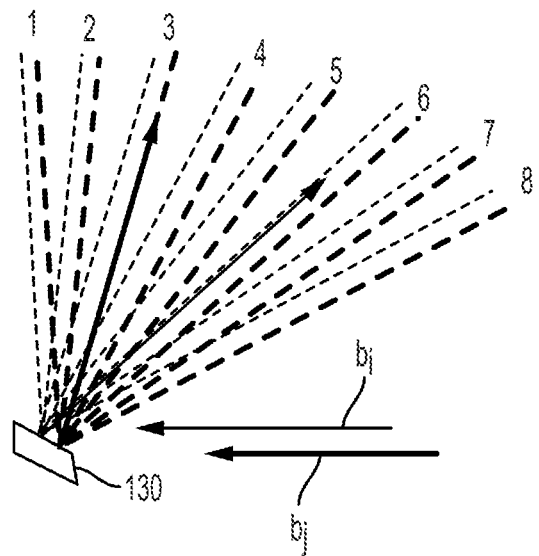
FIG. 14 is a schematic illustration of operation of an example of an image-per-angle projector configured to project a single beam $b_i$ of a first image into a first direction and to project a single beam $b_j$ of a second image into a second direction.

FIG. 14 is a schematic illustration of operation of a projector 100 (shown in FIG. 4) where first source 140 (shown in FIG. 4) is configured to project a single beam $b_i$ of a first image (or a subset of the beams $b_1, b_2 \ldots b_{m \times n}$ constituting an entire image) into a first direction (e.g., corresponding to diffraction order 3) and to project a single beam $b_j$ of a second image (or a subset of the beams constituting an entire second image) into a second direction (e.g., in the illustration, corresponding to diffraction order 6). By timing the emission of the beams $b_1$-$b_{m \times n}$ from source 140, such that they occur at different times during a single cycle (e.g., a single transition from an ON state to an OFF state in a digital micromirror), the image in the first direction and the second direction can be updated at selected locations within an image. It will be appreciated that such a configuration may be useful, for example, when images in directions (e.g., 1-8) are projected using a data compression scheme.

Figure 15:
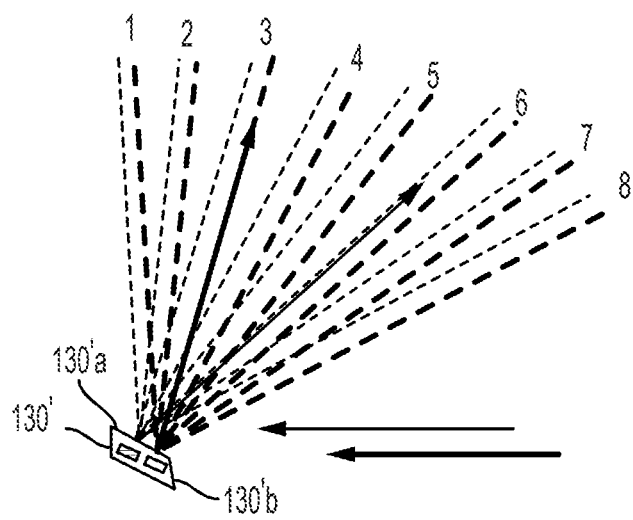
FIG. 15 is a schematic illustration of operation of another example of an image-per-angle projector configured to project a single beam $b_i$ of a first image into a first direction and to project a single beam $b_j$ of a second image into a second direction.

FIG. 15 is a schematic illustration of the operation of a projector 100 (shown in FIG. 4) where first source 140 (shown in FIG. 4) is configured to project a single beam $b_i$ of a first image (or a subset of the beams constituting an entire image) into a first direction (e.g., corresponding to diffraction order 3 in the illustration) and to project a single beam $b_j$ of a second image (or a subset of the beams constituting an entire second image) into a second direction (e.g., corresponding to diffraction order 6 in the illustration) using an alternative technique to that discussed above with reference to FIG. 14. In the projector of the present technique, different portions of ALM 130' (illustrated as a DMD) are operated with the actuation elements of the first portion 130'a delayed in phase relative to the actuation elements of second portion 130'b (e.g., the actuatable mirrors of first portion 130'a of the DMD are at a different angular state between the ON state and OFF state than the actuatable mirrors of second portion 130'b when the illumination occurs). Alternatively, the DMD may be configured such that the actuation elements in the first portion and the second portion have different starting positions (e.g., the actuation elements in the first portion start in a first state (e.g., the ON state) and the actuation elements in the second portion start in a second state (e.g., the OFF state). In such an embodiment, both portions 130'a and 130'b can be actuated at a first same time, and the beams can be projected onto the first portion and the second portion at a second same time (different than the first same time), and the beam incident on the first portion would be projected in a different direction than the beam incident on the second portion. By operating the mirrors in portions 130'a and 130'b, as set forth above, a portion of the image in the first direction and a portion of the image in the second direction can be updated at selected locations within an image. It will be appreciated that, similar to the configuration discussed with reference to FIG. 14, such a configuration may be useful, for example, when images in directions (e.g., diffraction orders 1-8) are projected using a data compression scheme.

"Image Per Column (IPC)"

Figure 16:
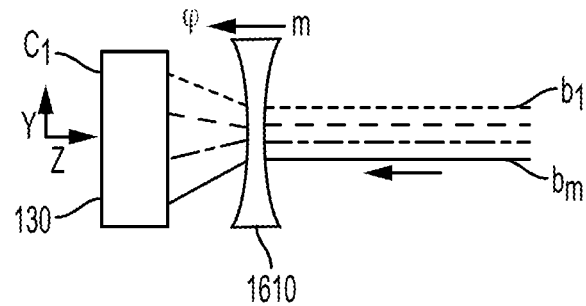
FIGS. 16, 18 and 19 are schematic illustrations of the operation one column of an ALM of a projector configured to produce images at various angles by sequentially projecting all columns of each image of a data cube onto a corresponding column of an ALM and varying the direction of projection of light from each column of the ALM to produce a plurality of output images (referred to herein as an image-per-column projection system)

In some embodiments, each image in a data cube is projected by generating a sequence of columns $k_1$-$k_s$ of independently modulated beams $b_1, b_2 \ldots b_m$ onto an ALM 130 (shown in FIG. 16). At a given time, each column $c_1$, $c_2 \ldots c_z$ of the ALM projects light corresponding to a column of pixels $k_1$-$k_s$ in an image of a data cube (shown in FIG. 17A). The beams $b_1, b_2 \ldots b_m$ may be generated by first source 140 as described above. The columns of the various images (e.g., images 1-8) may be simultaneously (shown in FIGS. 17B and 17C) or sequentially projected onto the ALM (and directed to a viewer by the ALM). Although 8 images are projected in the illustrated embodiment, any suitable number of images may be projected.

Figure 17A:
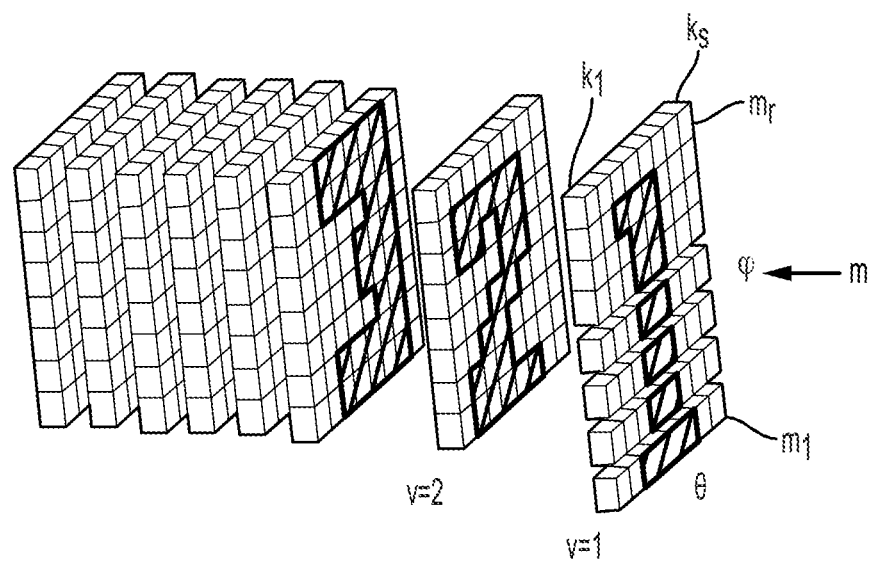
FIG. 17A is a schematic of an image-per-angle data cube.
Figure 17B:
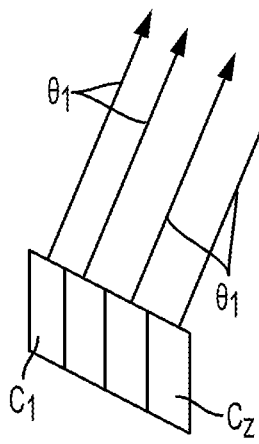
FIGS. 17B and 17C are schematic illustrations of the operation of multiple columns of an ALM of an image-per-column projector where all columns project at a first angle at a first time and all columns projects at a second angle at a second time, respectively.
Figure 17C:
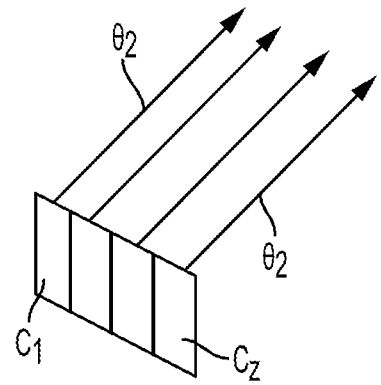
Figure 18:
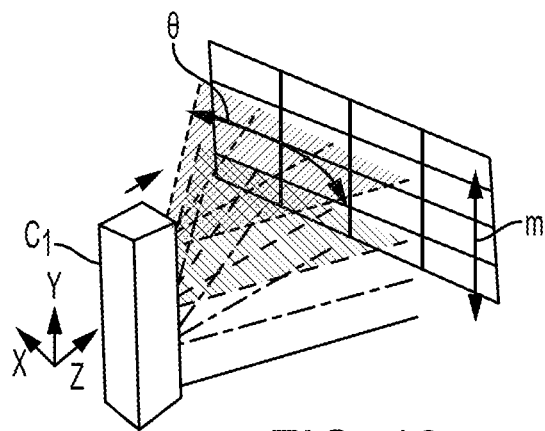
Figure 19:
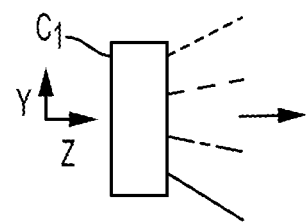

Each column of pixels $c_1$-$c_z$ of actuatable elements on the ALM receives a corresponding column of beams $b_1, b_2 \ldots b_m$. As shown in FIG. 18, each pixel in a column of the ALM is configured to scan across the angular space θ as the sequential columns of beams $b_1, b_2 \ldots b_m$ corresponding to columns $k_1$-$k_s$ are projected onto a column of pixels $c_1, c_2 \ldots c_z$, thereby projecting the light in each row $m_1$-$m_r$ in an entire final image (e.g., images 1-8). As shown in FIGS. 17B and 17C, each image (images 1-8) is projected by a corresponding column $c_1$-$c_z$.

Figure 1:
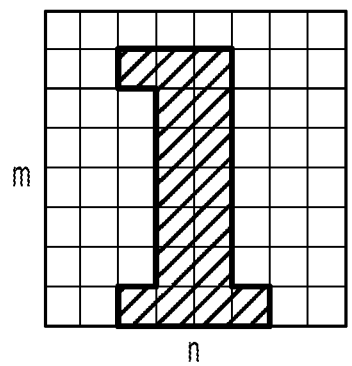
FIG. 1 illustrates a data array of brightness levels.
Figure 2:
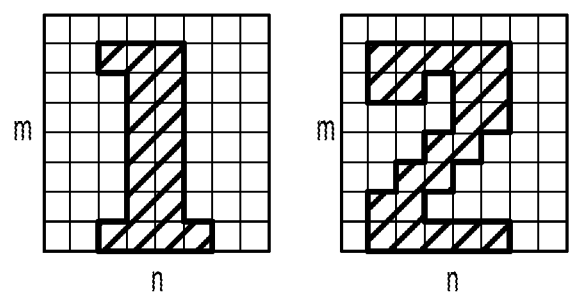
FIG. 2 two data arrays of brightness levels defining a frame of a 3D image.
Figure 3:
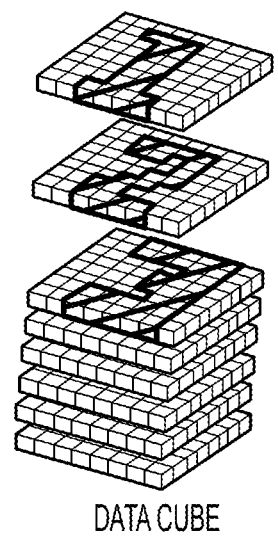
FIG. 3 is a data cube of two-dimensional data arrays.

Referring to FIGS. 4 and 18, source 140 (shown in FIG. 1) is configured to modulate light in each beam $b_1$-$b_m$ to produce a sequence of picture segments across angle θ, and the ALM is synchronized with the source 140 so that each of the columns of beams $b_1, b_2 \ldots b_m$ in the sequence can be directed into a different direction along a row of an image. Since columns on the ALM are actuated independently of each other, each column can create an entire image as shown in FIG. 17A (i.e., one of 1-8). By projecting columns of beams $b_1, b_2 \ldots b_m$ corresponding to different images at different columns $c_1, c_2 \ldots c_z$ of pixels on the ALM, different images can be generated by each column on the ALM.

As shown in FIG. 16, a lens 1610 can be added before the ALM in Image-Per-Column operation. The lens can have any or all of three functions: (1) the lens can be used to project beams onto selected pixels of ALM 130; (2) the lens (for example, a cylindrical lens with optical power along the dimension of an ALM column (e.g., $c_1$) can be used to diverge the beams $b_1, b_2 \ldots b_m$ relative to one another in dimension m (shown in FIG. 18) to match the angle of divergence in dimension θ, and (3) the angles of projection θ (shown in FIG. 17B) of light from various columns $c_z$ can be made to differ from one another. It is to be appreciated that, in some embodiments, lens 1610 can comprise multiple lens elements, and the three functionalities described above can be individually tuned by using a combination of rotationally symmetric and/or cylindrical lenses.

The ALM may steer beams $b_1, b_2 \ldots b_m$ in columns using an implementation where the angles are determined by diffraction (i.e., each beam is directed onto a plurality of actuatable elements) as described above or where the light in each beam is projected onto a single mirror whose angle varies continuously (e.g., using a single mirror of a DMD).

It will be appreciated that modulating the output of each beam $b_1$-$b_m$ corresponding to segments $k_1$-$k_s$, and synchronizing the beam steering of the ALM (in directions θ), results in a complete image from each column. The number of columns $c_1$-$c_z$ of pixels of the ALM that project images determines the number of images of the data cube (referred to herein as an Image-Per-Column data cube) projected by a projector 100. The number of beams $b_1, b_2 \ldots b_m$ (and independent pixels in a column on the ALM) corresponds to the number of pixels in a column in each final image. The number of angular locations $k_1$-$k_s$ in the beam steering of the ALM equates to the number of pixels in a row in each final image. From the discussion above, it is to be appreciated that a data cube can be projected using either image-per-angle or image-per-column techniques, although the image formation occurs along different dimensions. In the FIG. 17A, n represents different columns of a DMD, m (transformed to φ) represents different rows of the final image, and θ represents different columns of the final image. The coordinates φ and θ are in angular space.

It will be appreciated that the Image-Per-Angle (IPA) method defines each image in the spatial domain (n and m), while the Image-Per-Column (IPC) method defines each image in the angular domain (θ and φ). A combination is also possible (θ and m), for instance by removing the lens in FIG. 16. The tradeoffs between IPA and IPC include data cube refresh order (defining one full image vs the first column of all images) and object-image geometry (different starting domain for lens transformation, i.e. IPC may be more easily made into a near-eye display).

Figure 20:
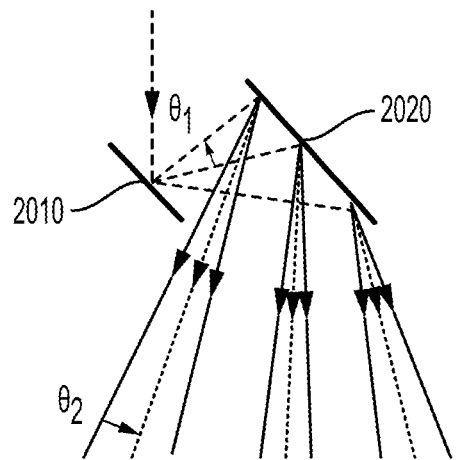
FIG. 20 is a schematic illustration depicting a technique of using multiple, cascaded ALMs to increase the total scan angles.

Another aspect of the invention is directed to increasing the number of diffraction orders produced by an ALM. Any embodiments described above using diffraction orders of an ALM to steer beams of light may have the number of possible directions increased by increasing the number of diffraction orders produced by the ALM. FIG. 20 is a schematic illustration depicting a technique of using multiple, cascaded DMDs as ALM 130 (shown in FIG. 4) in place of a single DMD. As illustrated, the techniques include having two DMDs placed next to each other so that the beam steered from first DMD 2010 is steered onto second DMD 2020. It is to be appreciated that the number of total scan angles resulting from such a configuration is the number of angles of the generated by first DMD 2010 multiplied by the number of scanning angles generated by second DMD 2020.

In the above figure, DMD 2010 first steers the beam into one of three diffraction angles. The angle between these diffraction orders is $θ_1$. This steered beam is then steered again by DMD 2020. In the above figure, the second DMD is also able to steer the beam into one of three diffraction angles. In the above instance, $θ_2=θ_1/3$. But it is also possible to have other configurations. One such configuration is where the DMDs are configured such that $θ_2=3*θ_1$.

Figure 21:
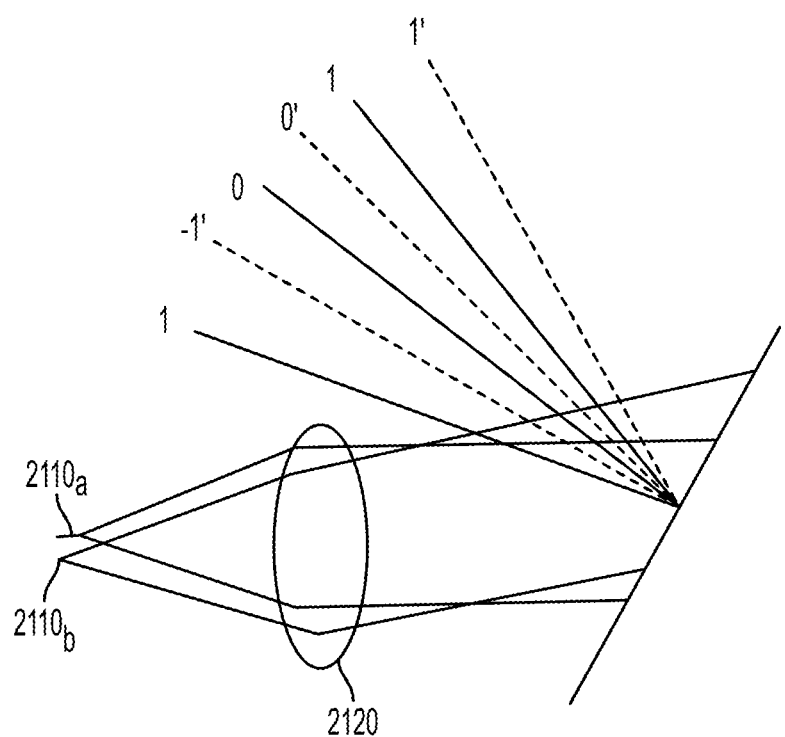
FIG. 21 is a schematic illustration depicting another technique to increase the total scan angles using an array of light sources.

As shown in FIG. 21, an additional technique for increasing the number of directions into which light can be directed applies to embodiment shown in FIG. 7A. If source 110 (i.e., a single laser) were replaced with an array of sources (i.e., an array of lasers represented by lasers 2110a-2210b) (typically of a same wavelength) projecting light at a single collimating lens 2120. The beam from each laser would be projected onto ALM 130 at a different angle than other sources in the array, thereby resulting in light being projected at additional angles −1 to 1' (i.e., spaced at location between the illustrated diffraction orders −1 to 1 in the illustrated embodiment). Alternatively, in some embodiments, each laser in the array has its own collimating lens (not shown), where each collimating lens is arranged to project light at the ALM at a different angle.

Figures 22A, 22B, 22C:
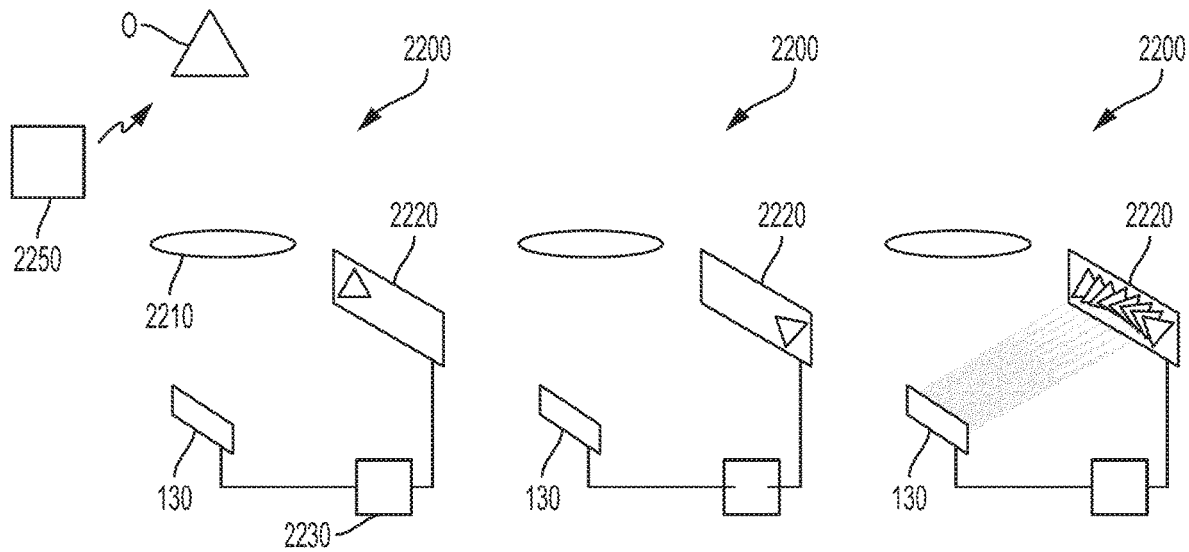
FIGS. 22A-22C are schematic illustrations of a camera comprising an ALM to capture a sequence of images of an object using incoherent or coherent light, according to another aspect of the invention.

FIGS. 22A-22C are schematic illustrations of a camera 2200 comprising an ALM 130 to capture a sequence of images of an object using incoherent or coherent light, according to another aspect of the invention. Camera 2200 comprises a lens 2210, ALM 130, detector array 2220 (also referred to herein as detector 2220) and a processor 2230.

Lens 2210 is adapted to receive (i.e., collect) light from object O and form images $I_1$-$I_N$ of the object on detector array 2220. Lens 2210 may comprise a single lens element or plurality of lens elements to process the light in series, and may be configured as a conventional camera lens suitable for imaging objects of a particular size, type and at a particular distance as is known in the art.

ALM 130 is a spatially-dependent, angular light modulator comprising a plurality of actuatable elements as described herein. ALM 130 is positioned to receive the light from object O collected by lens 2210, onto the plurality of actuatable elements.

Processor 2230 is coupled to the ALM and the detector array. Processor 2230 is adapted to operate the actuatable elements to project a first image $I_1$ of the object onto a first portion of the detector array. Processor 2230 is also adapted to actuate the actuatable elements to project a second image I₂ of the object onto a second portion of the detector array. Processor 2230 controls detector and processes the output images as described herein. It will be appreciated that although a single processor is shown, one or more processors may be used to control the ALM and detector as described herein.

In camera 2200, when the DMD achieves an angle to efficiently direct the light into an order that is directed onto detector 2230, an image of object O is captured as shown. When light from multiple orders is directed onto detector 2230 at different times, a series of images can be obtained.

The number of diffraction orders that can be fully generated for a given setup, $N_{Max}$, is a function of: wavelength ($\lambda$), mirror pitch (p), maximum mirror tilt angle ($\alpha$), and angle of incidence on DMD ($\beta$). The maximum number of scan spots is determined by the number of diffraction orders that exist between the "ON" angle and the "OFF" angle defined by the DMD's maximum tilt angle of the micromirrors (or a selected first state and second state). If the DMD mirrors have rotation angles of $+/-\alpha$, then the reflected beam has a maximum deflected angle of $+/-2\alpha$. The larger $\alpha$ is, the more scan spots that are possible. As shown by Equation 2, the grating equation can be used to determine the angles of diffraction possible if $\lambda$, p, and $\beta$ are given. For a diffraction order, m, the diffraction angle from the $0^{th}$ order is given as $\theta_m$.

$$\theta_m = \arcsin\left(\frac{2m\lambda}{p} - \sin(\beta)\right) + \beta \quad (2)$$

Thus, if $\lambda$, p, B, and $\alpha$ are given, it is possible to determine $N_{Max}$ using Eq. 3 below. The function "floor" operates to round $N_{Max}$ down to the nearest integer.

$$N_{max} = \quad (3)$$
$$1 + \text{floor}\left|\frac{p[\sin(2\alpha - \beta) + \sin(\beta)]}{2\lambda}\right| + \text{floor}\left|\frac{p[\sin(-2\alpha - \beta) + \sin(\beta)]}{2\lambda}\right|$$

ALM 2230 may be a digital micromirror (DMD) or any actuatable device capable of generating an output therefrom having a same or similar phase map to a DMD may be used, such as a grating light valve, a membrane mirror, a linear deformable mirror or a reflection-type LCOS phase modulator.

In some embodiments, the processor operates the plurality of actuatable elements of ALM 2230 such that they project the first image I₁ at a first angle determined by a first diffraction order of the ALM (i.e., the plurality of actuatable elements operate as a blazed grating to direct light into first diffraction order as described herein) at a first time, and such that the plurality of pixels project the second image I₂ at a second angle determined by a second diffraction order of the ALM (i.e., the plurality of actuatable elements operate as a blazed grating to direct light into second diffraction order as described herein) at a second time. The first images is projected onto a first portion of the detector and the second image is projected onto a second portion of the detector. The first portion and the second portion may be completely distinct or partially overlap.

Detector array 2220 may be any suitable, pixelated detector capable of capturing light of the relevant wavelength(s) and recording a brightness level. For example, the detector array may be a CMOS device or a CCD device or an avalanche photodiode (APD) array such as "Si APD array" by Hamamatsu of part no. S8550-02.

Figure 22D:
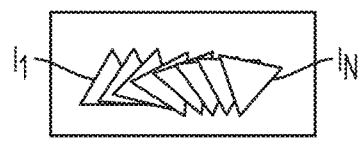
FIGS. 22D-22E are schematic illustrations of examples of images and sub-images captured by a camera as shown in FIGS. 22A-22C.
Figure 22E:
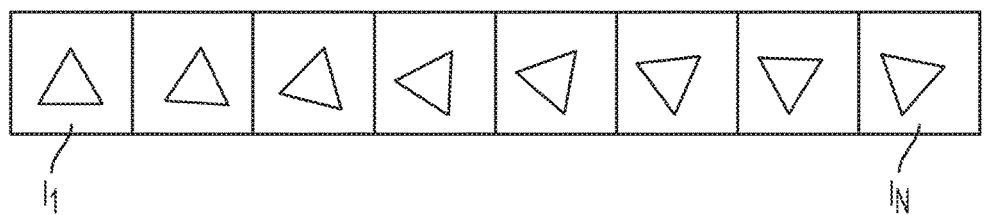

It will be appreciated that, in some instances, as shown in FIG. 22D, the sequential images projected onto the detector will overlap. In such instances, it may be desirable to separate individual images. FIG. 22D shows the images of FIGS. 22D and 22E, when the sub-images are separated, along with examples of time tags for the various sub-images. Below, is one example of a mathematical technique to separate the images; however, any suitable technique may be used. The processor may be programmed to separate the images using a mathematical technique, such as the technique below where an inverse matrix is applied to pixel coordinate information to calculate the position of the object at various times in object coordinates. In the event the inverse matrix calculation is not feasible to calculate directly, a Moore-Penrose pseudoinverse, singular-value decomposition, Jacobi iteration, or Gauss-Seidel iteration method may be used, which is common in the art. The processor may be same processor that controls the actuatable elements of the ALM or a different processor.

$x_f$, $y_f$=Field Coordinates in object space
$x_p$, $y_p$=Pixel Coordinates on the detector
t=Time
$\bar{F}(x_f, y_f; t)$=[Original Transient Field Data—at the object]
$\bar{E}(x_p, y_p)$=[Detector Exposure Data Matrix—at the detector]
$\bar{\tau}(x_p, y_p; x_f, y_f; t)$=[Mapping Matrix]
$\bar{E}=\bar{\tau}\,\bar{F}$ [Optical mapping from field at different times to detector]
$\bar{\tau}^{-1}\bar{E}=\bar{\tau}^{-1}\bar{\tau}\bar{F}$
$\bar{\tau}^{-1}\bar{E}=\bar{F}$ [Inverse mapping from detector to field data at different times]

It will be appreciated that the limitation on time resolution for complete frames captured by a camera, using analog operation to continuously sweep the mirror, is the total transition time of the DMD (e.g., 2.4 ρs for the above example DMD) divided by the number of pixels across the horizontal axis of the detector greater than the number of pixels across the individual extrapolated frame (as shown in Equation 2).

$$\Delta t = \frac{DMD \text{ transition time}}{\left(\begin{array}{c}\text{\# horizontal detector pixels} - \\ \text{\# horizontal single frame pixels}\end{array}\right)} \quad (2)$$

In some embodiments, camera 2200 comprises an illumination source to illuminate object O. In some embodiments, the illumination source is pulsed light source which may provide a freezing effect for the ALM as described above (e.g., where the ALM is a DMD).

Light source 110 is adapted to provide the incident wavefront in pulses of light having a maximum duration, $t_{max}$, to the DMD, where $t_{max} \leq T$. Light source 110 may be collimated or uncollimated, coherent or quasi-coherent, monochromatic or quasi-monochromatic. For example, light source 120 may be a laser with or without a collimating lens or an LED with or without a collimating lens. For example, $T/t_{max}$ may be equal to greater than any of 50, 100, 250. Timing of the light pulses is determined, for example, as described above with reference to FIG. 8F.

It will be appreciated that a pulse of short duration ($t_{max} \leq T$) when projected onto DMD 110 is diffracted into one of the specific diffraction orders with relatively high diffraction efficiency since a short pulse of light duration causes the DMD mirrors to appear to be in frozen state in a particular state that is equivalent to a blazed grating where the slope of the mirror is set to the blaze angle. Typically, all mirrors in the array onto which the light is projected are controlled to be actuated to a same degree (i.e., they have the same blaze angle); however, in some embodiments, only a subset of mirrors (at least 90% or at least 80% or at least 50% or at least 25%) are controlled to be actuated to a same degree.

Figure 22F:
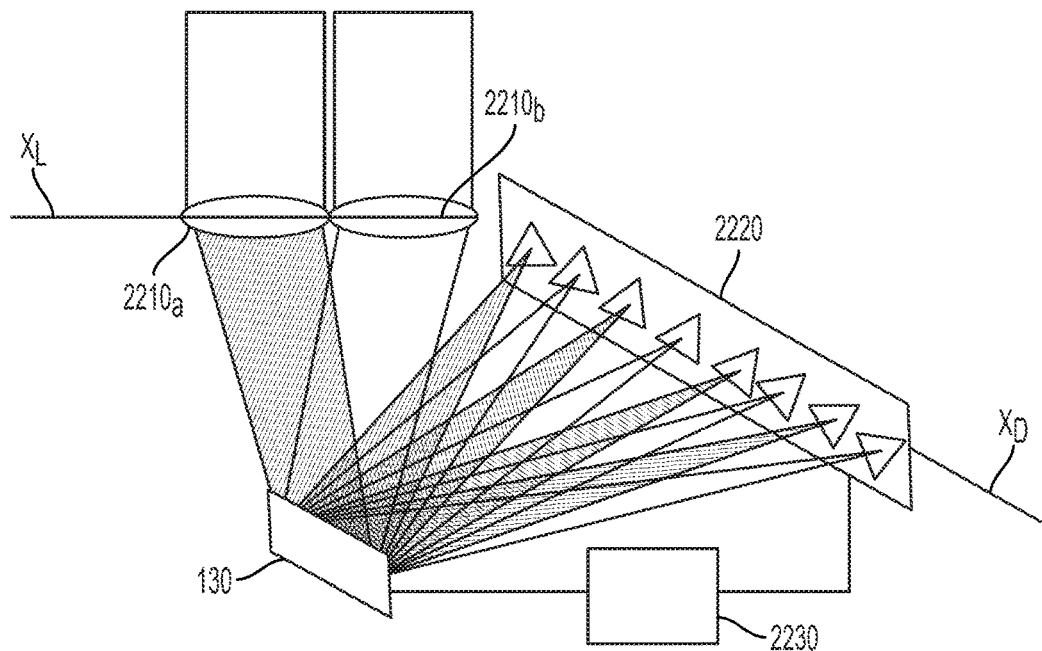
FIG. 22G is a schematic illustration of a camera having two lenses offset from one another.
FIG. 22H shows lenses having an offset in direction $x_L$.
Figure 22G:
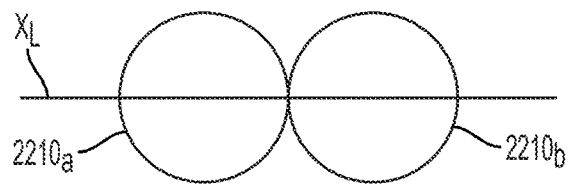

FIG. 22F is a schematic illustration of a camera 2260 that is the same as camera 2220 shown in FIG. 22A, except that camera 2260 comprises two lenses 2210a and 2210b positioned to image object O onto detector 2220. Lenses 2210a and 2210b may be same as lens 2210 described above, and may be the same as one another or different. Lenses are offset in the $x_L$ direction which corresponds to the direction $x_D$ on detector 2220 in the imaging system of camera 2260 (i.e., direction $x_L$ optically maps to direction $x_D$), direction XD also corresponding to the direction along which the diffraction orders of ALM 130 occur. Direction $x_D$ is typically the length of detector 2220. FIG. 22G shows the offset of lenses 2210a and 2210b having an offset in direction $x_L$ more clearly.

The inventors have determined that by offsetting the lenses by a distance $x_L$ the locations and time at which object O achieves an angle to efficiently direct the light into a diffraction order that is directed onto detector 2230 are different from one lens to another. Accordingly, images of object O obtained by lens 2210a and 2210b are obtained, with the images formed by lens 2210a occurring at times times $ta_1$-$ta_n$, and images formed by lens 2210b occurring at times $tb_1$-$tb_n$, thereby allowing more images of object O to be obtained, at shorter intervals of time and distance. Although a camera having two lenses is shown, two or more lenses may be used. The lenses may be positioned such that the diffraction orders from the lenses are offset from one another. The diffraction order may be interleaved.

Figure 22H:
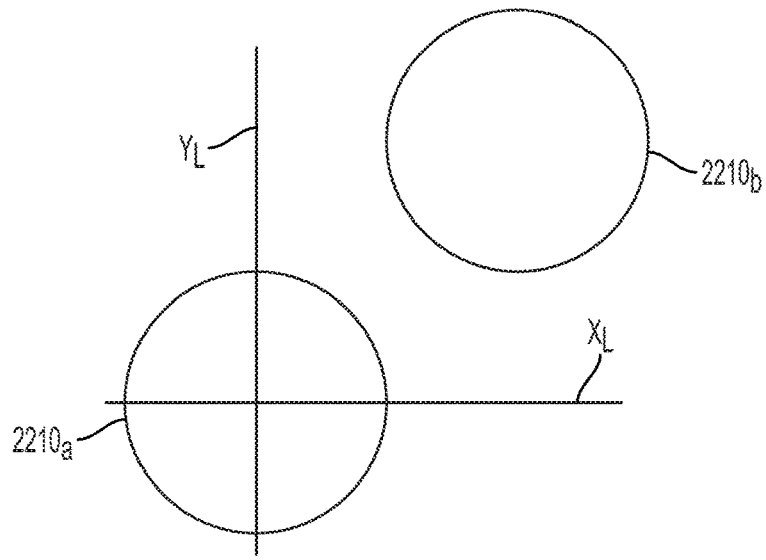
Figure 23:
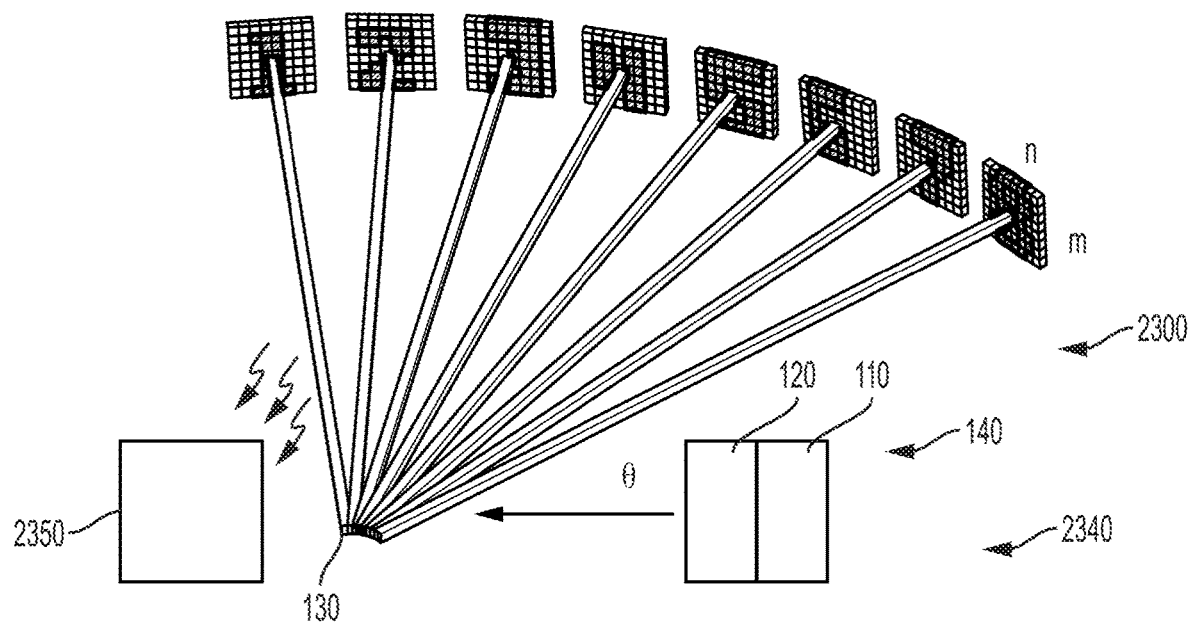
FIG. 23 is a schematic illustration of an illumination systems comprising an ALM to make time of flight measurements.

The inventors have determined that by offsetting the lenses in a direction $y_L$, in a direction that is perpendicular to direction $x_L$, the images of object O can be offset in a direction $y_D$ in a direction that is perpendicular to direction $x_D$. Such a configuration allows the series of images obtained by lens 2210a to be formed at a location apart from the series of images obtained by lens 2210b. FIG. 22H shows that lenses 2210a and 2210b can be offset in both directions $x_L$ and $y_L$ The inventors have also determined that image-per-angle systems as described above provide a mechanism for outputting a selected beam among an array of beams for use in a time of flight system. In accordance with such determination, FIG. 23 is a schematic illustration of an illumination systems 2300 comprising an ALM 130 to make time of flight measurements, for example for use in a LIDAR system or a structured light illumination system for use with a 3D scanner or a point sample system (e.g., for use with a gaming console) or for coded aperture illumination, according to another aspect of the invention. Illumination system 2300 comprises a light source 2340 (e.g., first source 140 comprising a light controller 120 as described above), a spatially-dependent angular light modulator 130 and a detector 2350.

Light source 2340 comprises an array of laser diodes.

Light controller 120 is optically or electrically coupled to the light source, such that that a combination of the light source and the light controller constitutes a first source 140 of a two-dimensional array of beams of light where each beam in the array is selectively projectable from the combination (and from illumination system 2300). As described with reference to FIG. 4, light controller 120 may comprise a processor programmed to selectively output a beam in the array from a light source or programmed to operate the light controller (e.g., the light controller may comprise an SLM) to selectively transmit a beam in the array of beams from the combination (i.e., first source 140) onto the angular light modulator 130.

Each beam in the array is selectively projectable onto the angular light modulator 130. Spatially-dependent, angular light modulator 130 is positioned to receive each of the beams of light in the array. It is to be appreciated that the beams of the array may be directed onto the ALM at different times or a same time. Angular light modulator 130 is adapted to selectively direct the light from each beam into one of a plurality of directions. The plurality of directions can be determined by the selected diffraction order of the ALM or by focusing the beam onto a selected mirror of a DMD (where the selected mirror can be tilted between a first state (e.g., an ON state of a DMD) and a second state (e.g., an OFF state of a DMD)) (as described with reference to FIG. 4 above).

It will be appreciated that, like the image-per-angle description above, each beam in the array can be projected into any of a number of different angles. For example, in some embodiments, first source 140 can be controlled to project a first beam from only one laser in the array of lasers and a pixel of the ALM on which the first beam is incident can be configured to project the beam into one of a plurality of diffraction orders (e.g., the number 1-8 in FIG. 23 correspond to 8 diffraction orders). As a result, a large number of directions can be selectively illuminated.

In some embodiments, the illumination system is coupled to a conventional range finding detection module 2350 comprising a detector that may be used to measure distance (e.g., using time of flight from when the laser light is output from illumination system 2350 until a reflection of the beam off an object is received by the detector; module 2350 is coupled to the light source so that information regarding the time that the light is projected can be combined with information regarding the time at which the light is detected to determine a time difference and a corresponding distance to the object). It is noted that, while this example uses a time-of-flight (TOF) range finding scheme, other range finding schemes can be used by varying the source and range finding detection module programming in the processor. Some other examples of range finding schemes include frequency modulation, coded waveforms, heterodyne detection, and gated capture.

Figure 24:
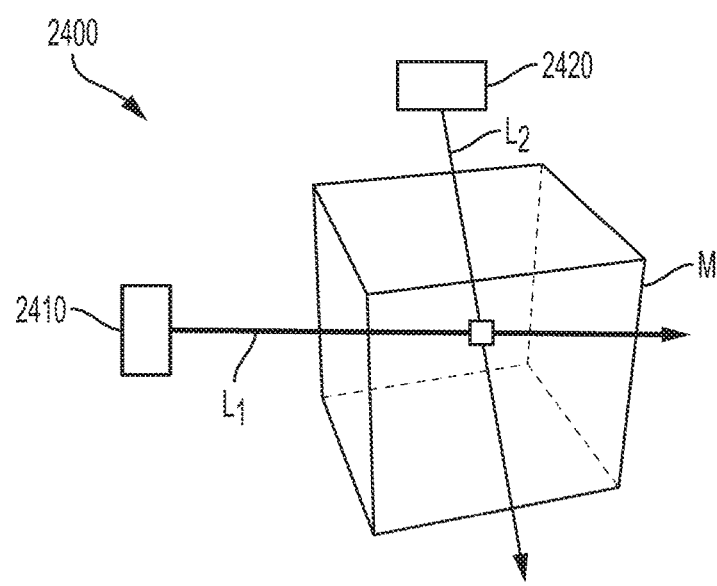
FIG. 24 is a schematic illustration of a multibeam interaction system including an illumination system comprising a first ASLM subsystem and second ASLM system.

FIG. 24 is a schematic illustration of a multibeam interaction system 2400 which is an illumination system comprising a first ASLM subsystem 2410 and second ASLM system 2420. The first ASLM subsystem and second ASLM subsystem are configured such the light projected from the first subsystem $L_1$ and the second subsystem $L_2$ intersect. The first subsystem and the second subsystem may have any configuration of a light source, a light controller, and a spatially-dependent, angular light modulator (ALM) as set forth herein that is suitable for generating intersecting beams (e.g., illumination system 2300).

For example the first subsystem and second subsystem may constitute a system where the light from the first subsystem and the second subsystem intersect within a medium M. The medium may be a lithographic medium such that the system constitutes a 3D lithographic system.

In another example, first subsystem 2410 and second subsystem 2420 constitute multiphoton illumination sources for a microscopy system. In another system, medium M is a medium that allows for 3D writing (i.e., by fluorescence) in medium M.

Although various embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A camera to obtain a sequence of images of an object, comprising:
   a first lens adapted to receive light from the object;
   an angular light modulator (ALM) comprising a plurality of actuatable elements, each of the plurality of pixels configured to transition between an ON state having an ON angle and an OFF state having an OFF angle and positioned to receive the light from the first lens and further configured to project the light into one of at least three diffraction orders each corresponding to a unique angle by actuating between a first angle of a first diffraction order and a second angle of a second diffraction order;
   a detector array positioned to receive the light from the ALM and simultaneously capture multiple images of the same object using the at least three different diffraction orders; and
   at least one processor coupled to the ALM adapted to actuate the actuatable elements between the ON and OFF states such that during the transition the light is projected in a first direction determined by the first diffraction order to project a first image of the object onto a first portion of the detector array and to actuate the actuatable elements in a second direction determined by the second diffraction order to project a second image of the object onto a second portion of the detector array.

2. The camera of claim 1, wherein the ALM comprises one of a digital micromirror device (DMD), a grating light valve, a membrane mirror, a linear deformable mirror or a reflection-type LCOS phase modulator.

3. The camera of claim 1, wherein the processor is programmed to actuate the plurality of actuatable elements of ALM in a third direction determined by a third diffraction order such that they project the third image determined by a third diffraction order of the ALM at a third time.

4. The camera of claim 1, wherein the detector is one of a CMOS array, a CCD array and an avalanche photodiode array.

5. The camera of claim 1, wherein the first image and the second image overlap, and the at least one processor is programed to separate the first image and the second image.

6. The camera of claim 1, further comprising an illumination source to illuminate the object.

7. The camera of claim 6, wherein the illumination source is a pulsed light source to achieve a freezing effect of the ALM.

8. The camera of claim 3, wherein the first diffraction order and the second diffraction order are offset from one another in a first direction, the camera further comprising a second lens adapted to receive light from the object and project the third image at the third angle of the third diffraction order of the ALM and the second lens, the first lens and the second lens being offset from one another in a second direction which optically corresponds to the direction along which the diffraction orders are offset.

9. The camera of claim 3, wherein the first diffraction order and the second diffraction order are offset from one another in a direction, the camera further comprising a second lens adapted to receive light from the object and project the third image at the third angle of the third diffraction order of the ALM and the second lens, the first lens and the second lens being offset from one another in a direction perpendicular to the direction which optically corresponds to the direction along which the diffraction orders are offset.

10. A LIDAR system to detect a position of an object, comprising:
    a light source;
    a light controller optically or electrically coupled to the light source, such that that a combination of the light source and the light controller constitutes a first source of a two-dimensional array of beams of light;
    a camera to obtain a sequence of images of the object, comprising:
      a first lens adapted to receive light from the object;
      an angular light modulator (ALM) comprising a plurality of actuatable elements, each of the plurality of pixels configured to transition between an ON state having an ON angle and an OFF state having an OFF angle and positioned to receive the light from the first lens and further configured to project the light into one of at least three diffraction orders each corresponding to a unique angle by actuating between a first angle of a first diffraction order and a second angle of a second diffraction order;
      a detector array positioned to receive the light from the ALM and simultaneously capture multiple images of the same object using the at least three different diffraction orders; and
      at least one processor coupled to the ALM adapted to actuate the actuatable elements between the ON and OFF states such that during the transition the light is projected in a first direction determined by the first diffraction order to project a first image of the object onto a first portion of the detector array and to actuate the actuatable elements in a second direction determined by the second diffraction order to project a second image of the object onto a second portion of the detector array;
    and
    a range finding detection module coupled to the light source and comprising a detector to receive each of the beams of light after the each of the beams of light is reflected from the object and to determine a time difference and corresponding distance to the object based on a time of flight between when the light source outputs each of the beams of light in the array into each unique angle according to one of the plurality of diffraction orders and when the detector receives each of the beams of light in the array after the each of the beams of light is reflected from the object.

11. The system of claim 10, wherein the ALM comprises a plurality of mirrors, the system further comprising a lens configured to focus light from at least one of the beams of light onto one of the plurality of mirrors, and the plurality of directions are determined by a tilt of the one of the plurality of mirrors.

12. The system of claim 10, wherein the light controller comprises a controller, the controller adapted to control the light source to selectively output one of the plurality of beams.

13. The system of claim 10, wherein the light controller comprises a spatial light modulator, the spatial light modulator configured to control an output of one of the plurality of beams from the first source.

14. An illumination system, comprising:
- a first angular-spatial light modulator (ASLM) subsystem having a first angular light modulator (ALM) comprising a first plurality of actuatable elements, wherein each of the first plurality of actuatable element configured to transition between an ON state having an ON angle and an OFF state having an OFF angle and further configured to project light into a first of at least three diffraction orders each corresponding to a first unique angle;
- a second ASLM system having a second angular light modulator (ALM) comprising a second plurality of actuatable elements, wherein each of the second plurality of actuatable element configured to transition between an ON state having an ON angle and an OFF state having an OFF angle and further configured to project light into a second one of at least three diffraction orders each corresponding to a second unique angle,
- wherein the first ASLM subsystem and second ASLM subsystem are positioned such that a first beam of light projected from the first subsystem at a first unique angle according to the first one of the at least three diffraction orders and a second beam of light projected from the second subsystem at a second unique angle according to the second one of the at least three diffraction orders will intersect.

15. The system of claim 14, wherein at least one of the first ASLM and the second ASLM comprises a plurality of mirrors, the system further comprising a lens configured to focus light from at least one of the first beam and the second beam on a corresponding one of the plurality of mirrors, a tilt of the one of the plurality of mirrors determining a direction of the at least one of the first beam and the second beam.

16. The system of claim 14, wherein the at least one of the first ASLM and the second ASLM comprises a light source and a processor, the processor adapted to control the light source to selectively output one of the first beam and the second beam.

17. The system of claim 14, wherein the at least one of the first ASLM and the second ASLM comprises a spatial light modulator, wherein the spatial light modulator is configured to control to selectively output one of the first beam and the second beam.

* * * * *